(12) United States Patent
Wang et al.

(10) Patent No.: US 10,708,810 B2
(45) Date of Patent: Jul. 7, 2020

(54) METHODS FOR WIFI INTEGRATION IN CELLULAR SYSTEMS

(71) Applicant: INTERDIGITAL PATENT HOLDINGS, INC., Wilmington, DE (US)

(72) Inventors: Guanzhou Wang, Brossard (CA); Ghyslain Pelletier, Montreal (CA); Diana Pani, Montreal (CA); Pascal M. Adjakple, Great Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/538,394

(22) PCT Filed: Dec. 23, 2015

(86) PCT No.: PCT/US2015/000470
§ 371 (c)(1),
(2) Date: Jun. 21, 2017

(87) PCT Pub. No.: WO2016/105568
PCT Pub. Date: Jun. 30, 2016

(65) Prior Publication Data
US 2017/0374579 A1    Dec. 28, 2017

Related U.S. Application Data

(60) Provisional application No. 62/096,385, filed on Dec. 23, 2014, provisional application No. 62/144,823, filed on Apr. 8, 2015.

(51) Int. Cl.
*H04W 28/02* (2009.01)
*H04L 12/875* (2013.01)
(Continued)

(52) U.S. Cl.
CPC ......... *H04W 28/0278* (2013.01); *H04L 47/30* (2013.01); *H04L 47/566* (2013.01);
(Continued)

(58) Field of Classification Search
CPC . H04W 28/0278; H04W 28/08; H04W 88/06; H04W 72/1215; H04L 47/30; H04L 47/566; H04L 47/24
See application file for complete search history.

(56) References Cited

U.S. PATENT DOCUMENTS

2010/0062800 A1    3/2010  Gupta et al.
2012/0094681 A1*   4/2012  Freda ............... H04W 72/02
                                                   455/452.1
(Continued)

FOREIGN PATENT DOCUMENTS

| WO | WO-2010081368 A1 * | 7/2010 | ............ H04W 4/08 |
|----|--------------------|--------|----------|
| WO | 11/159215          | 12/2011 |          |
| WO | 16/164714          | 10/2016 |          |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
(Continued)

Primary Examiner — Minjung Kim
(74) Attorney, Agent, or Firm — Volpe and Koenig, P.C.

(57) ABSTRACT

Embodiments may include methods, systems, and apparatuses for integrating a first radio access technology and a second radio access technology in a wireless transmit/receive unit (WTRU). The embodiments may include: gathering, by the WTRU, one or more metrics related to uplink/downlink transmissions; determining, based on the one or more metrics, that an amount of data from the first radio
(Continued)

access technology should be offloaded to the second radio access technology; transmitting a first portion of the data to a base station using the first radio access technology; and transmitting a second portion of the data to a wireless local access network (WLAN) access point (AP) using the second radio access technology, wherein the WLAN AP is connected to the base station through an interface.

14 Claims, 15 Drawing Sheets

(51) Int. Cl.
| | |
|---|---|
| *H04L 12/835* | (2013.01) |
| *H04W 72/12* | (2009.01) |
| *H04W 88/06* | (2009.01) |
| *H04W 28/08* | (2009.01) |
| *H04L 12/851* | (2013.01) |

(52) U.S. Cl.
CPC ............ *H04W 28/08* (2013.01); *H04L 47/24* (2013.01); *H04W 72/1215* (2013.01); *H04W 88/06* (2013.01)

(56) References Cited

U.S. PATENT DOCUMENTS

| | | | |
|---|---|---|---|
| 2013/0044877 A1* | 2/2013 | Liu .................. | H04W 8/26 380/270 |
| 2013/0176988 A1 | 7/2013 | Wang et al. | |
| 2013/0216043 A1* | 8/2013 | Ginzboorg ............ | H04L 63/205 380/270 |
| 2014/0064184 A1* | 3/2014 | Cherian ................ | H04L 61/103 370/328 |
| 2014/0078906 A1 | 3/2014 | Chen et al. | |
| 2014/0079022 A1 | 3/2014 | Wang et al. | |
| 2015/0092676 A1* | 4/2015 | Periyalwar ............ | H04W 4/029 370/329 |
| 2015/0334599 A1* | 11/2015 | Maaref ................ | H04L 5/0041 370/236 |
| 2016/0088542 A1* | 3/2016 | Belghoul .......... | H04W 28/0268 370/331 |
| 2016/0262170 A1* | 9/2016 | Lee ...................... | H04W 16/14 |

OTHER PUBLICATIONS

Intel Corporation et al., "User Plan Architecture Aspects of LTE/WLAN aggregation," 3GPP TSG-RAN2 Meeting #89bis, R2-151193, Bratislava, Slovakia (Apr. 20-24, 2015).
Intel Corporation, "Motivation for new SI: Integrated LTE-WLAN RATs," RP-140685, Sophia Antipolis, France (Jun. 10-13, 2014).
Intel Corporation, "New Study Item Proposal: Integrated LTE-WLAN RATs," 3GPP TSG RAN Meeting #64, RP-140684, Sophia Antipolis, France (Jun. 10-13, 2014).
Interdigital Communications, "Details of LWA Adaption Layer," 3GPP TSG-RAN WG2 #91, R2-153804, Beijing, China (Aug. 24-28, 2015).
Interdigital Communications, "Quality-of-Service (QoS) with LTE+WLAN Aggregation in LTE R13," 3GPP TSG-RAN WG2 #90, R2-152564, Fukuoka, Japan (May 25-29, 2015).
Qualcomm Incorporated, "Study Item proposal on E-UTRAN and WLAN Aggregation," 3GPP TSG RAN Meeting #64, RP-14xxxx (RP-140738), Sophia Antipolis, France (Jun. 10-13, 2014).
Qualcomm, "Motiviation for LTE-WiFi Aggregation," 3GPP RAN #64, RP-140739, Sophia Antipolis, France (Jun. 10-13, 2014).
Third Generation Partnership Project, "Technical Specification Group Services and System Aspects; Architecture enhancements for non-3GPP accesses (Release 13)," 3GPP TS 23.402 V13.0.0 (Dec. 2014).
Third Generation Partnership Project, "Technical Specification Group Services and System Aspects; Architecture enhancements for non-3GPP accesses (Release 13)," 3GPP TS 23.402 V13.4.0 (Dec. 2015).
Third Generation Partnership Project, "Technical Specification Group Radio Access Network; Evolved Universal Terrestrial Radio Access (E-UTRA); Physical layer procedures (Release 12)," 3GPP TS 36.213 V12.3.0 (Sep. 2014).
Third Generation Partnership Project, "Technical Specification Group Radio Access Network; Evolved Universal Terrestrial Radio Access (E-UTRA); Physical layer procedures (Release 12)," 3GPP TS 36.213 V12.7.0 (Sep. 2015).
Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.3.0 (Sep. 2014).
Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.7.0 (Sep. 2015).
Third Generation Partnership Project, "Technical Specification Group Radio Access Network; Evolved Universal Terrestrial Radio Access (E-UTRA); Multiplexing and channel coding (Release 12)," 3GPP TS 36.212 V12.2.0 (Sep. 2014).
Third Generation Partnership Project, "Technical Specification Group Radio Access Network; Evolved Universal Terrestrial Radio Access (E-UTRA); Multiplexing and channel coding (Release 12)," 3GPP TS 36.212 V12.6.0 (Sep. 2015).
Third Generation Partnership Project, "Technical Specification Group Radio Access Network; Evolved Universal Terrestrial Radio Access (E-UTRA); Medium Access Control (MAC) protocol specification (Release 12)," 3GPP TS 36.321 V12.3.0 (Sep. 2014).
Third Generation Partnership Project, "Technical Specification Group Radio Access Network; Evolved Universal Terrestrial Radio Access (E-UTRA); Medium Access Control (MAC) protocol specification (Release 12)," 3GPP TS 36.321 V12.7.0 (Sep. 2015).
Third Generation Partnership Project, "Technical Specification Group Radio Access Network; Evolved Universal Terrestrial Radio Access (E-UTRA); User Equipment (UE) procedures in idle mode (Release 12)," 3GPP TS 36.304 V12.2.0 (Sep. 2014).
Third Generation Partnership Project, "Technical Specification Group Radio Access Network; Evolved Universal Terrestrial Radio Access (E-UTRA); User Equipment (UE) procedures in idle mode (Release 12)," 3GPP TS 36.304 V12.6.0 (Sep. 2015).
Third Generation Partnership Project, "Technical Specification Group Radio Access Network; Evolved Universal Terrestrial Radio Access (E-UTRA); Packet Data Convergence Protocol (PDCP) specification (Release 12),"3GPP TS 36.323 V12.1.0 (Sep. 2014).
Third Generation Partnership Project, "Technical Specification Group Radio Access Network; Evolved Universal Terrestrial Radio Access (E-UTRA); Packet Data Convergence Protocol (PDCP) specification (Release 12)," 3GPP TS 36.323 V12.4.0 (Jun. 2015).

* cited by examiner

METHODS FOR WIFI INTEGRATION IN CELLULAR SYSTEMS

CROSS REFERENCE TO RELATED APPLICATIONS

This application is the U.S. National Stage, under 35 U.S.C. § 371, of International Application No. PCT/US2015/000470 filed Dec. 23, 2015, which claims the benefit of U.S. Provisional Application No. 62/096,385, filed on Dec. 23, 2014, and U.S. Provisional Application No. 62/144,823, filed on Apr. 8, 2015, the contents of which are hereby incorporated by reference herein.

BACKGROUND

The industry has shown a trend in which mobile network operators are rolling out their own WiFi networks to enable wireless transmit/receive units (WTRUs) to access Evolved Packet Core (EPC) Packet Switched (PS) services using a wireless local area network (WLAN). There may be technical and operational advantages for these operators to integrate WLAN access points (APs) with their base stations, especially for the deployment of small cell overlay. The co-located, or connected, base station/AP scenario may make it possible to have proprietary inter-node communication between the base station and the AP, and may open the door for additional mechanisms for WiFi offloading to provide more throughput and a better user experience.

SUMMARY

Embodiments may include methods, systems, and apparatuses for integrating a first radio access technology and a second radio access technology in a wireless transmit/receive unit (WTRU). The embodiments may include: gathering, by the WTRU, one or more metrics related to uplink/downlink transmissions; determining, based on the one or more metrics, that an amount of data from the first radio access technology should be offloaded to the second radio access technology; transmitting a first portion of the data to a base station using the first radio access technology; and transmitting a second portion of the data to a wireless local access network (WLAN) access point (AP) using the second radio access technology, wherein the WLAN AP is connected to the base station through an interface.

An embodiment may include a WTRU configured to integrate a first radio access technology and a second radio access technology for wireless communication. The WTRU may include: a first transceiver and a second transceiver configured to gather one or more metrics related to uplink/downlink transmissions; at least one processor operatively coupled to the first transceiver and the second transceiver, the at least one processor configured to determine, based on the one or more metrics, that an amount of data from the first radio access technology should be offloaded to the second radio access technology; the first transceiver configured to transmit a first portion of the data to a base station using the first radio access technology; and the second transceiver configured to transmit a second portion of the data to a wireless local access network (WLAN) access point (AP) using the second radio access technology, wherein the WLAN AP and the base station are connected through an interface.

BRIEF DESCRIPTION OF THE DRAWINGS

A more detailed understanding may be had from the following description, given by way of example in conjunction with the accompanying drawings wherein.

DETAILED DESCRIPTION

Embodiments described herein may address different aspects of the integration of a first radio access technology, such as one based on 3GPP long term evolution (LTE), with a second radio access technology, such as one based on WiFi.

Figure 1A:
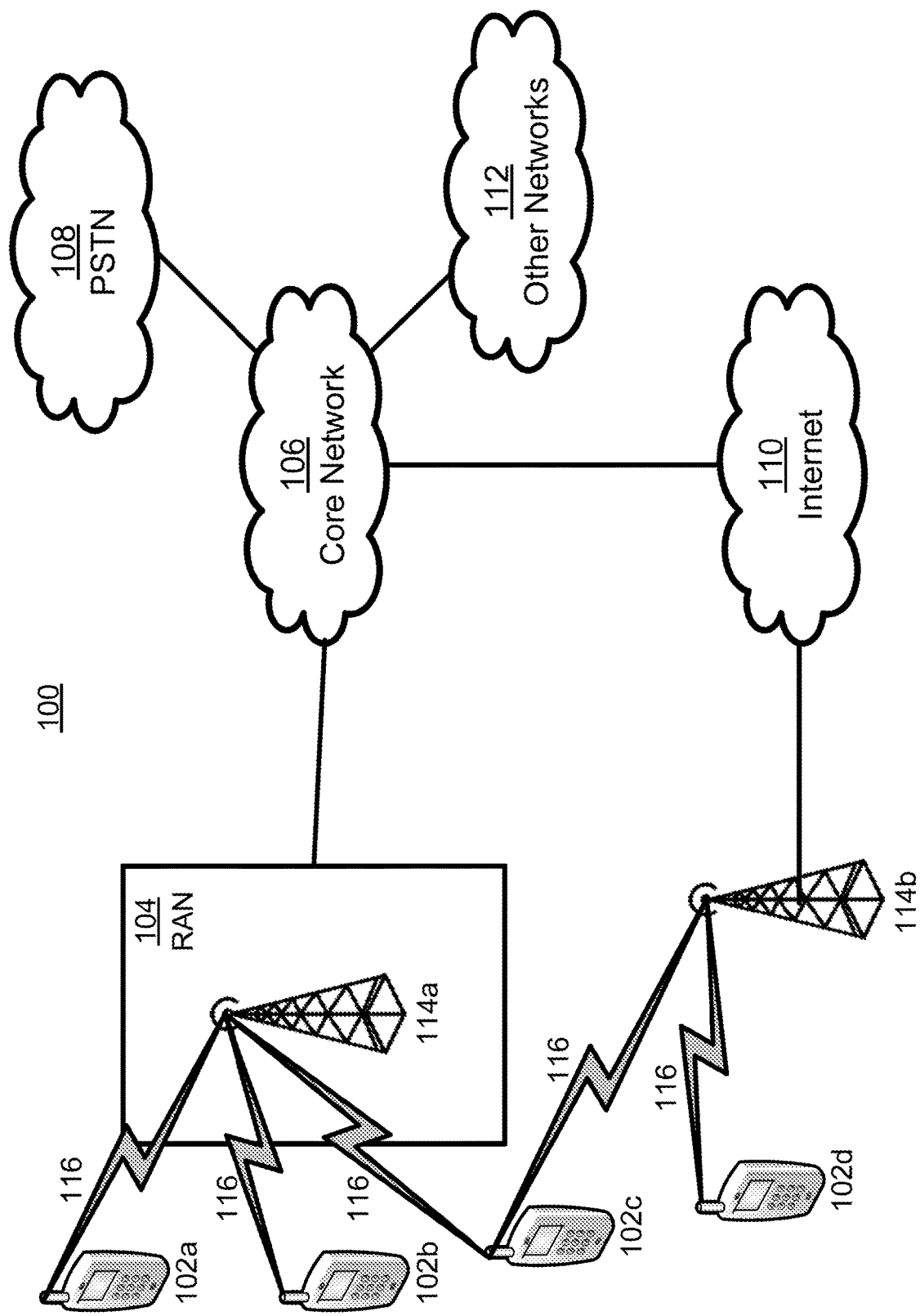
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call-control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
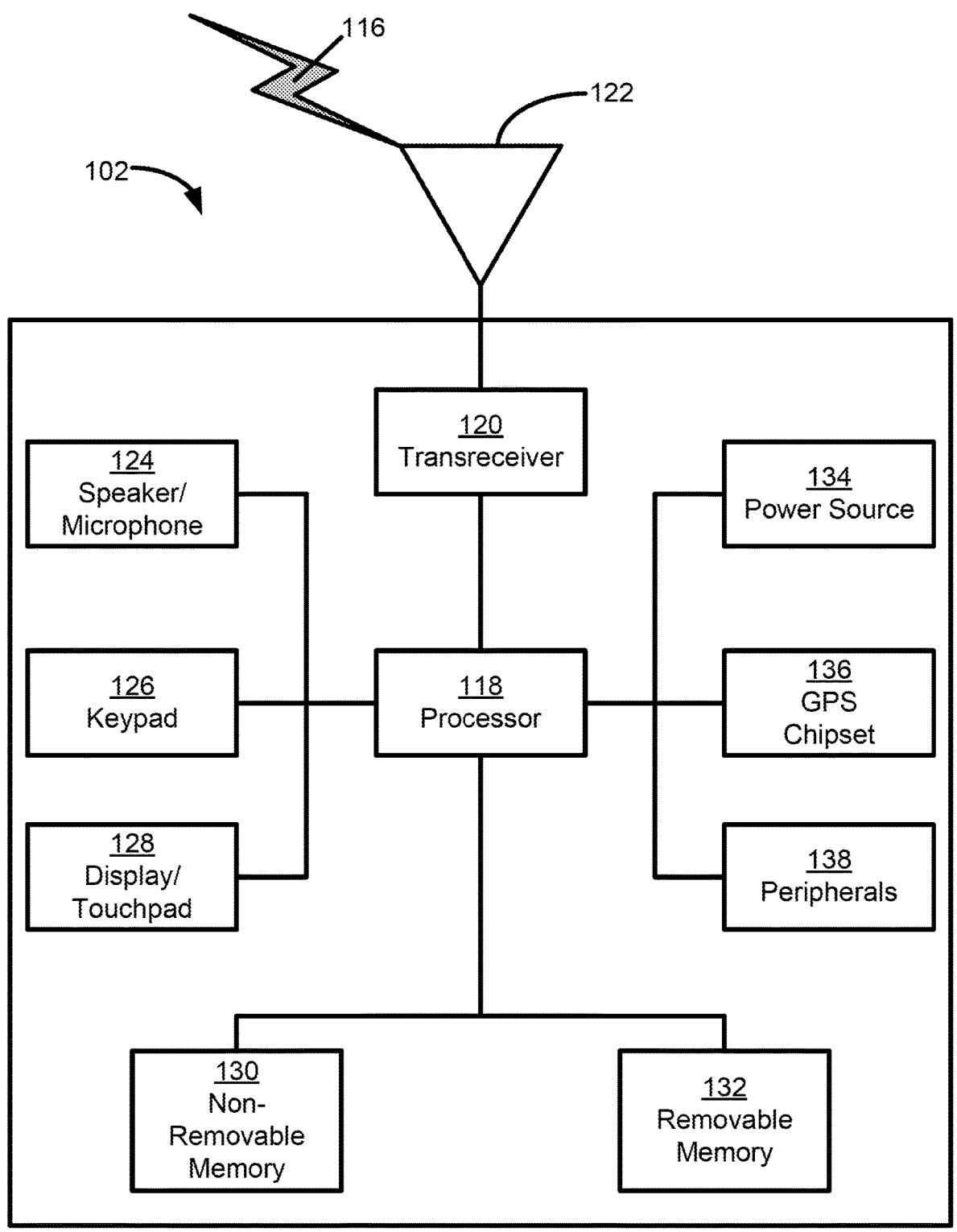
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player; a media player, a video game player module, an Internet browser, and the like.

Figure 1C:
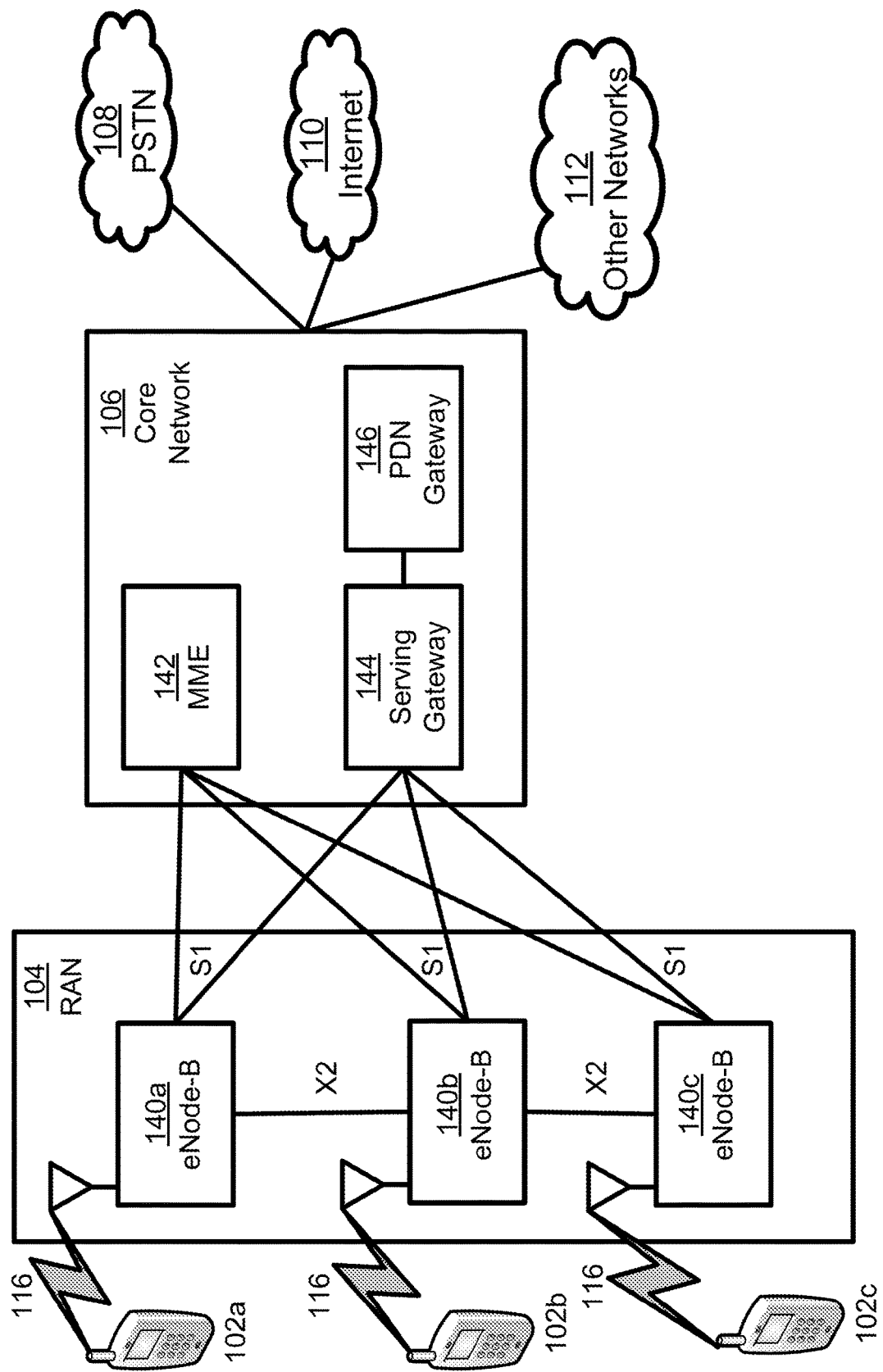
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Other network 112 may further be connected to an IEEE 802.11 based wireless local area network (WLAN)) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d. IEEE 802.11 WLAN systems may be referred to herein as WiFi systems.

Up to 3GPP Release 12 (R12), the design for WiFi offloading has typically focused on how to enable a WTRU to access the Evolved Packet Core (EPC) Packet Switched (PS) services using a wireless local access network (WLAN).

A WTRU may access the EPC using WLAN through three interfaces: S2a (trusted WLAN-PGW), S2b (untrusted WLAN-PGW) and S2c (DSMIP enabled WTRU-PGW). On the access network selection aspect, an Access Network Discovery and Selection Function (ANDSF) was introduced in 3GPP Release 8 (R8) to facilitate the access network discovery and selection. In all the offloading mechanisms built upon this architecture, up until 3GPP Release 11 (R11), the Radio Access Network (RAN) plays very little role.

R12 enhanced 3GPP/WLAN interworking by introducing a WLAN selection and traffic steering mechanism that uses RAN-based rules. The RAN rules may be defined in the RAN specification and uses a number of RAN thresholds (e.g., Reference Signal Received Power (RSRP)/Reference Signal Received Quality (RSRQ) thresholds) and WLAN thresholds (e.g., BssLoad thresholds and BackhaulRate thresholds). The thresholds may be provided by the RAN through broadcasting or using dedicated signaling. The WTRU may evaluate the RAN rule by comparing the RAN measurements or the WLAN information against the corresponding thresholds, and then may decide whether to select a WLAN or to steer traffic towards WLAN or 3GPP.

Using this mechanism, the traffic may only be offloaded on a per-Packet Data Network (PDN) basis. Based on the user subscription data, the MME may determine which PDNs are offloadable and indicate the offloadability information to the WTRU through non-access stratum (NAS) signaling.

In addition to the introduction of RAN-based offloading rules, R12 also extended some ADNSF policies (e.g., WLANSP, ISRP, IARP) with the RAN thresholds and WLAN thresholds. The thresholds may be provided to the WTRU by the RAN or by the ANDSF server.

This mechanism may enable the RAN to have certain control over the WTRU's WiFi offloading by adjusting the thresholds; however, the offloading decision may still be a WTRU function.

For 3GPP Release 13, proposals have been submitted in which the control plane may be anchored in the base station, while the user plane may be aggregated above the Media Access Control (MAC) layer Other proposals have focused on aggregating functions at the RLC layer.

Figure 2:
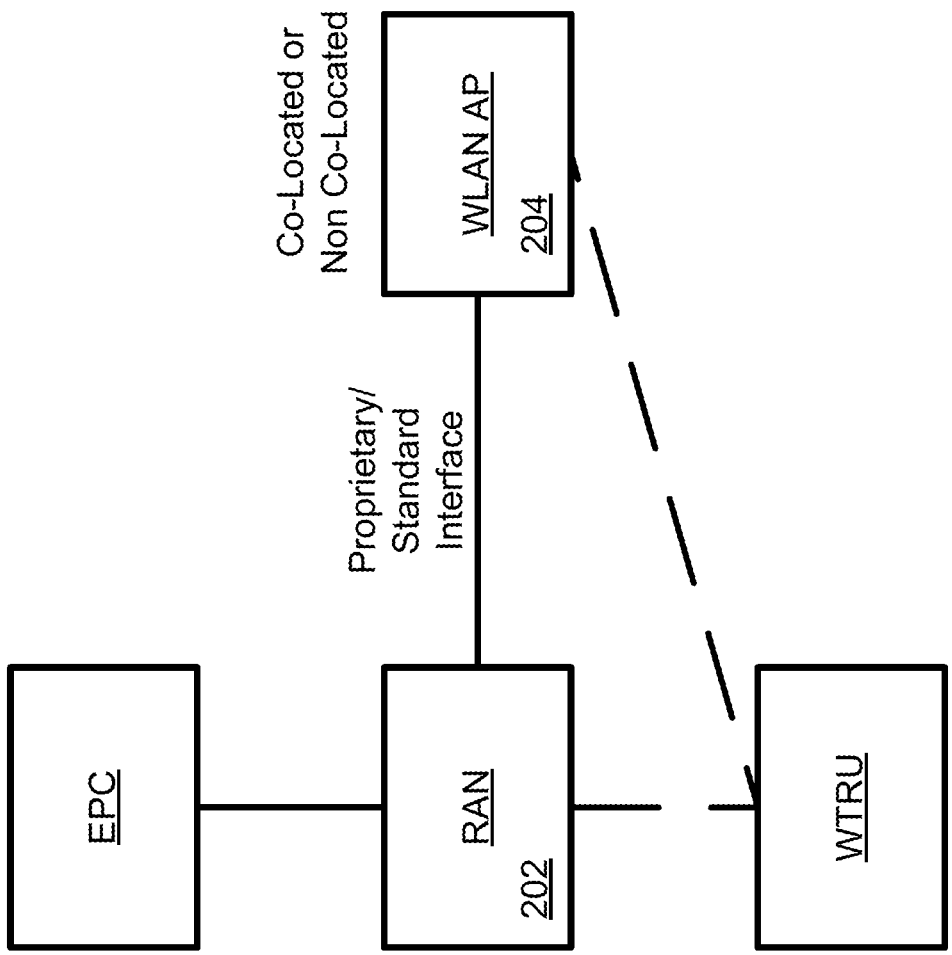
FIG. 2 is an illustration of modelling for integration between a radio access network (RAN) and a wireless local access network access point (WLAN AP)

Referring now to FIG. 2, an illustration of modelling for integration between a RAN 202 and a WLAN AP 204 is shown. There may be a number of scenarios where the RAN 202 and the WLAN AP 204 may be characterized using the following aspects. In an embodiment, the RAN node 202 (e.g., eNB) and WLAN access network node 204 (e.g., AP) may be logically co-located, and the interface between the RAN node and the WLAN AP may be internal and proprietary. In another embodiment, the LTE RAN node 202 and the WLAN access network node 204 may be non-co-located, and there may be a standard interface between the RAN 202 and the WLAN AP 204, or no interface in between. In the latter case, additional methods would extend the R12 WTRU-centric approach:

In both embodiments, the interface between the RAN 202 and the WLAN 204 may include a WLAN-specific controller and/or controlling function that manages and/or "hides" multiple WLAN APs.

There may be a number of ways to transport data traffic, such as, for example, user plane data. In one embodiment, there may be RAN-based anchoring. In this case, for a given bearer (e.g., an EPS bearer), the user plane may be anchored at the base station. The downlink traffic may be delivered to the base station associated with the WTRU's connection through a general packet radio service (GPRS) tunnel protocol (GTP)-based tunnel. The base station may then distribute the DL traffic either over the Uu interface or over the WLAN interface (or both, if redundancy and/or retransmissions are supported), possibly according to configured rules in the base station. Routing of the traffic may use different combinations of the Uu interface and the WLAN interface in terms of direction (i.e., uplink or downlink) and/or in terms of available interface (i.e., the traffic may use a single interface at a given time, or both split bearers may be supported).

One possible advantage of anchoring the user plane at the base station is that the need for an IP mobility solution for the traffic over WLAN link may be avoided. Having the user plane anchored at the base station does not necessarily imply that other offloading schemes, such as MAPCON/IFOM/SaMOG, in which the traffic is not passing through the base station at all, may not be used in parallel.

In an embodiment, there may be a core network (CN) interface split. In this case, for a given bearer (e.g., an EPS bearer), the user plane may be anchored at the node that exclusively serves data for this bearer (e.g., either the base station only or the WLAN AP only). The RAN node 202 may control the mobility while the WLAN AP 204 may have a direct connection (e.g., a GTP-based tunnel) to the core network or similar. Routing of the traffic may use a single interface, most likely for both downlink and uplink traffic.

One issue related to the further integration between RAN nodes and WLAN (e.g., for user plane aggregation) may be the determination of how user plane traffic is to be handled, and what additional methods and functions may be necessary. For example, the user plane modelling may determine at which layer the traffic is split/aggregated and how the base station/WTRU determines which flows/bearers should be sent over the Uu interface or over WLAN. Additional functions may be required in the layer in which the split occurs so that functions between that layer and the WiFi interface are coherent and so that the 3GPP QoS-related functions may be maintained (including reliability aspects). The data may be split above (or within) one of the PDCP, the RLC, or the MAC layer.

Figure 3:
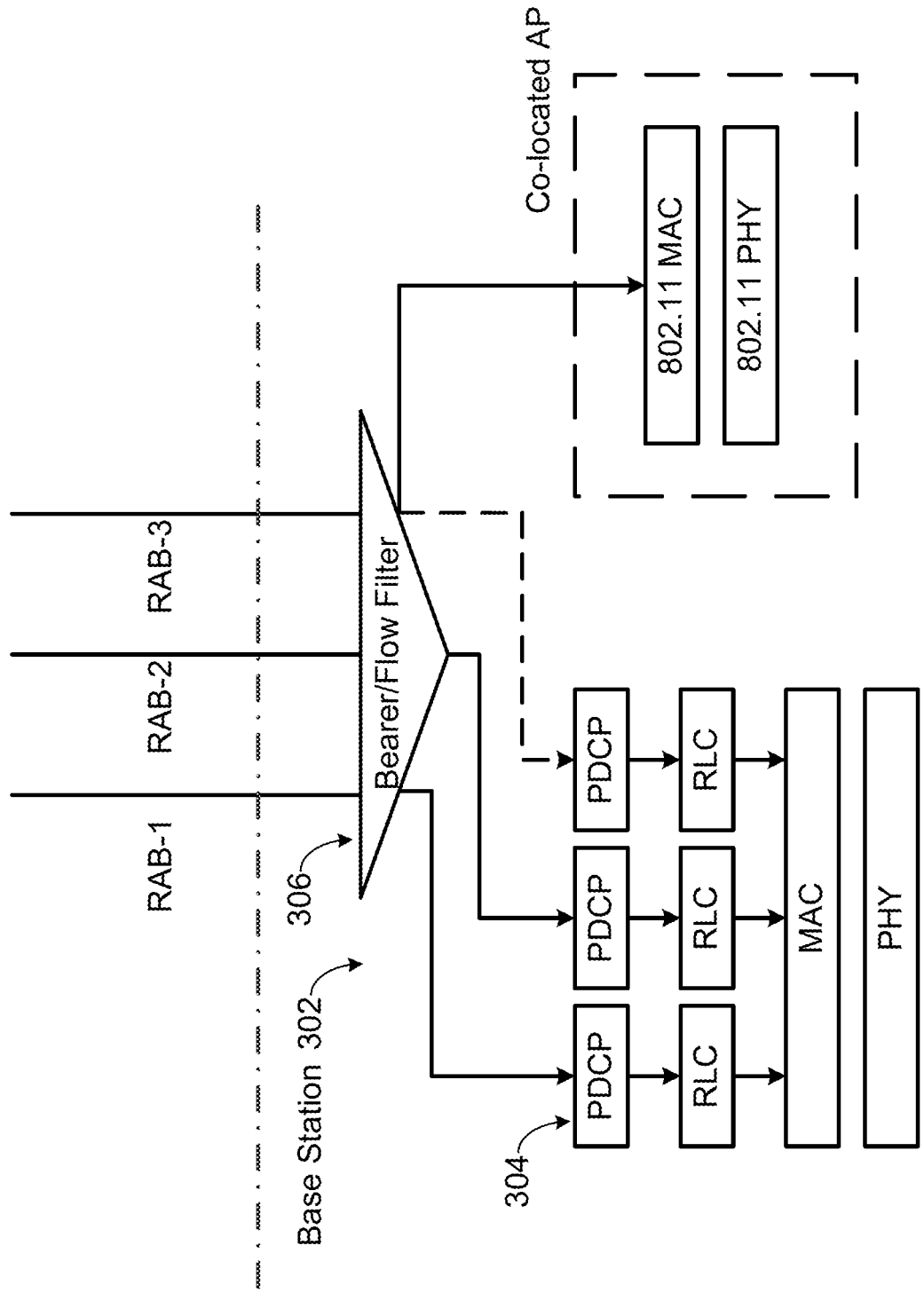
FIG. 3 is a diagram illustrating splitting downlink (DL) data from a network above a packet data control protocol (PDCP) layer of a base station.

Referring now to FIG. 3, a diagram illustrating splitting the DL data above the PDCP layer 304 of the base station 302 is shown. The base station 302 may have a filter function 306 to determine which of the two accesses traffic associated to a flow/bearer will be used. The DL data of a radio bearer may be entirely sent over the Uu interface or using the WLAN link based on the rules in the filter function. In an embodiment, part of the data of a RB may be sent over the Uu while the rest may be sent over the WLAN link. For traffic that is sent over WLAN, the IP packets may be retrieved from the S1-U packets and directly delivered in IEEE 802.11 frames. On the WTRU side, the WTRU may receive IP packets on both links and submit them to the upper layer.

Figure 4:
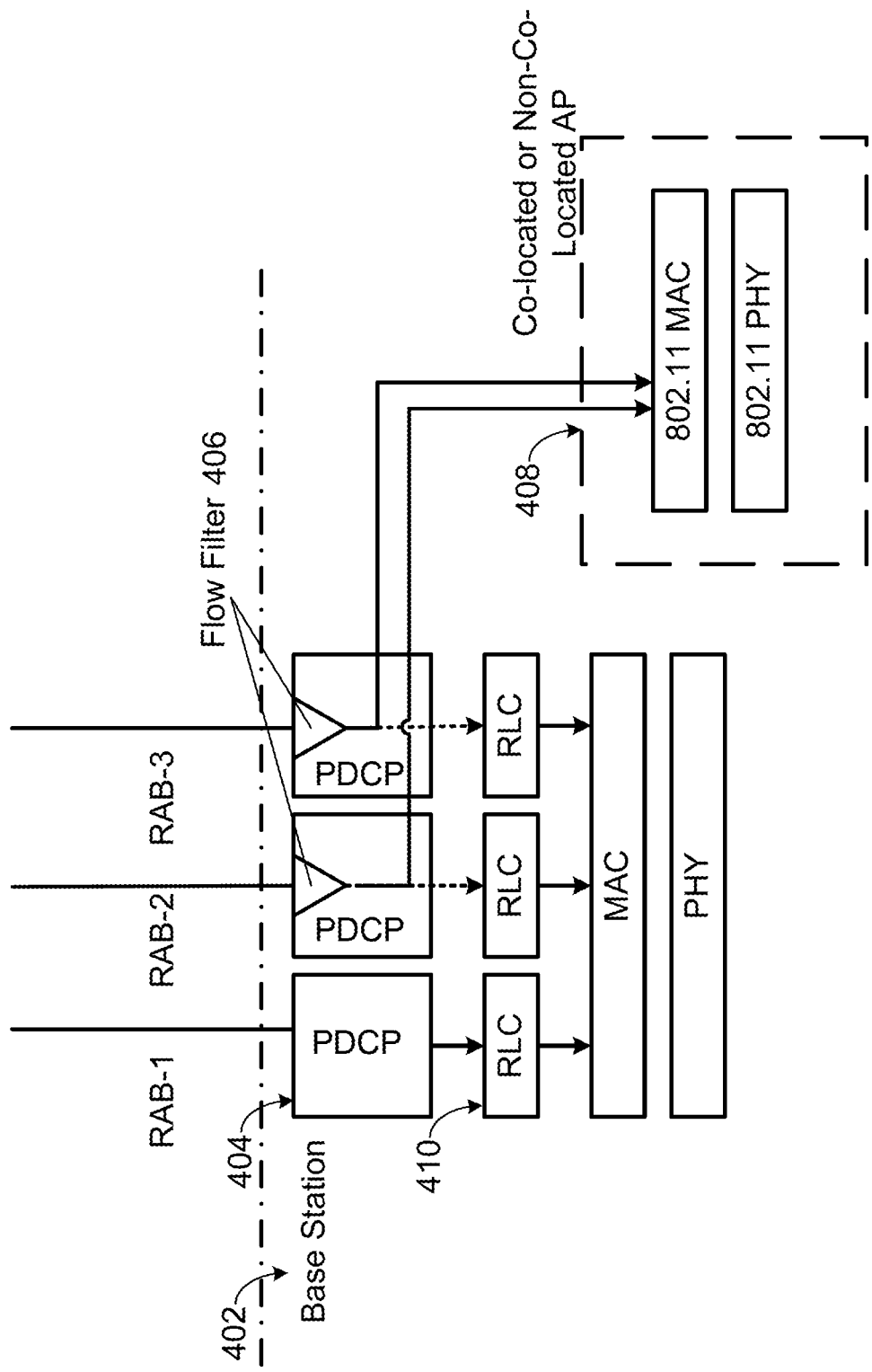
FIG. 4 is a diagram illustrating splitting the DL data within the PDCP layer.

Referring now to FIG. 4, a diagram illustrating splitting the DL data within a PDCP 404 layer of a base station 402 is shown. In this option, if the offloading is per-bearer instead of per-flow, there may be no need for a flow filter function 406 inside the PDCP entity and all the data coming into this PDCP entity will be offloaded to a WLAN AP 408. If the offloading is per-flow, a filter/split function 406 may be needed in the PDCP entity 404, and the data coming into this PDCP entity 404 may be sent to the underlying RLC entity 410 or sent to WLAN 408, depending on whether the flow is subjected to offloading. On the receiving side, the PDCP PDUs from the WLAN link may be collected by the corresponding PDCP entity, handled together with the PDCP PDUs received from the Uu link, and submitted to the upper layer. The advantages of this option may be that the data over WLAN link, can still benefit from the PDCP's compression and encryption functionalities. Similarly the data can also be split/aggregated at the RLC or MAC layer.

When data is transmitted using a plurality of radio interfaces, a number of aspects may need to be addressed. Those aspects may be introduced as a possible consequence of at least one of the following parameters. The first parameter may be whether or not the plurality of interfaces is of the same type of Radio Access Technology (RAT). For example, using transport services of different access types may require some form of adaptation of the protocol(s) affected and/or involved. Such adaptation may require new functionality. The second parameter may be the level of interactions and/or coordination between the plurality of interfaces, if any. For example, an increasing level of opacity between the implementations of the different interfaces may imply an increasing level of complexity.

The integration of a plurality of radio interfaces within a single device may be done according to a number of different alternatives. The following issues may need to be addressed: modeling of data transport services using multiple radio interfaces; modeling of the interaction between the plurality of interfaces, if any; protocol adaptation and enhancements; scheduling-related enhancements and QoS; uplink routing aspects; and possible interactions with the Core Network.

While the problems, principles and/or methods described herein may be generally applicable to the integration of different radio interfaces and/or radio access technology for any combination of such, the following embodiments may describe a first radio interface based on LTE access technology and a second radio interface based on IEEE 802.11/WiFi without loss of generality.

An embodiment may address the modeling of the data transport services using multiple radio interfaces. The modelling of the layer 2 from the WTRU's perspective may differ depending on the targeted deployment scenario and/or depending on the assumptions related to the network operation. One issue addressed from the perspective of the integration of WiFi to an LTE implementation is the impact of the different possible modeling of the data transport services.

Figure 5:
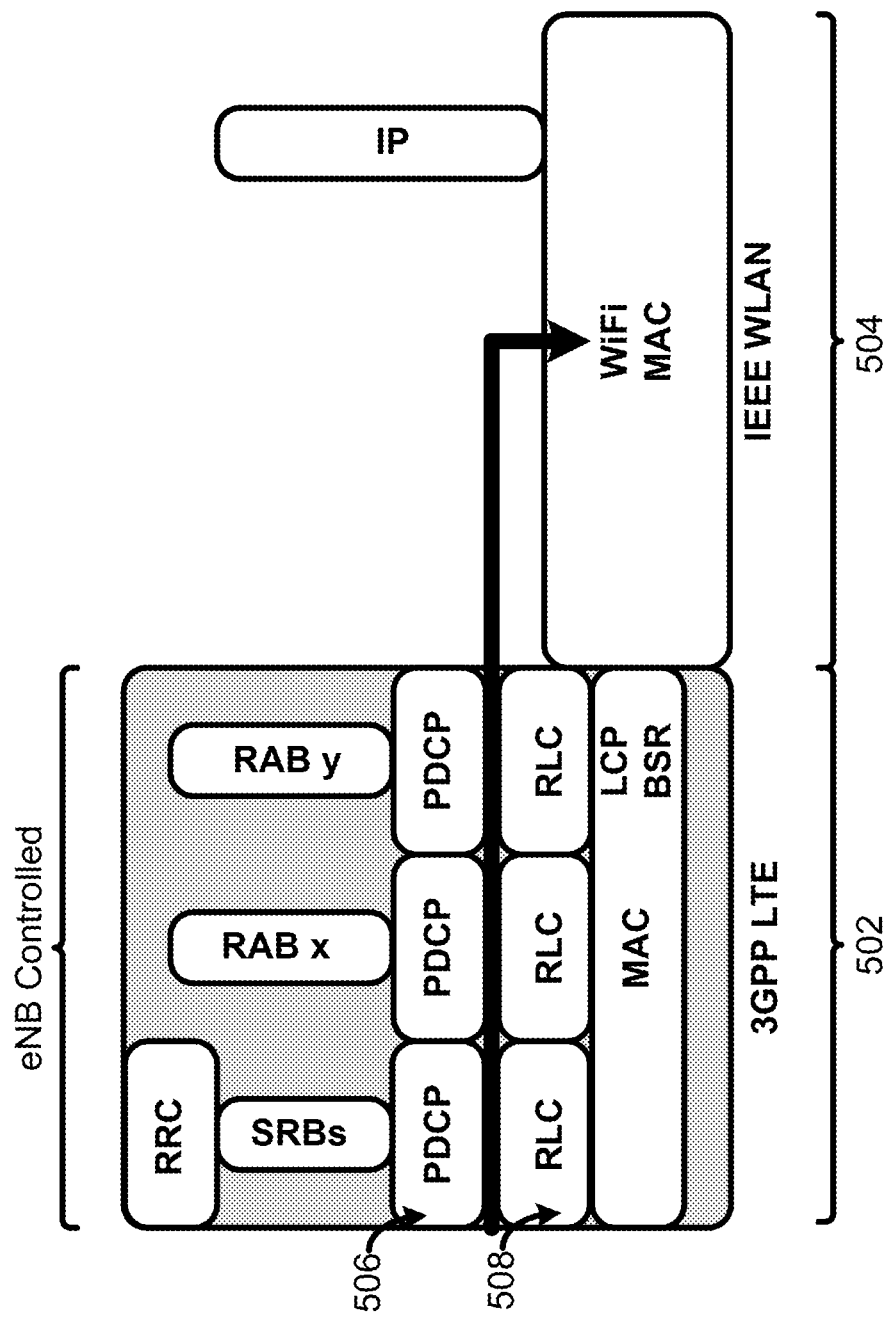
FIG. 5 is a diagram illustrating an integrated WLAN AP and base station implementation using a proprietary interface.

Referring now to FIG. 5 a diagram illustrating an integrated WLAN AP 504 and base station 502 implementation using a proprietary interface is shown. In one possible deployment scenario, from the perspective of the network, the implementation of the plurality of radio accesses (e.g., LTE eNB and the WLAN AP) may be physically co-located and coordination may be facilitated using a proprietary interface.

In this case, from the WTRU's perspective, the modelling of the user plane may be similar to that of carrier aggregation, where the WiFi interface would be considered as an additional resource to the WTRU. This may be similar in principle to handling WiFi connectivity as a "special cell"

of the WTRU's configuration. The modelling may then include support for transmitting data associated to a bearer using the plurality of radio accesses.

Restrictions for certain traffic and/or certain bearers may be introduced, such as by configuration and/or using dynamic methods (e.g., for uplink routing). Such restrictions and/or methods may have further impacts to MAC functions, such as the Logical Channel Prioritization (LCP) procedure and/or the Buffer Status Reporting (BSR) procedure and/or BSR signaling. In addition, functions and services no longer provided by the RLC layer 508 may impact PDCP 506 and/or other aspects of the user plane transport.

Figure 6:
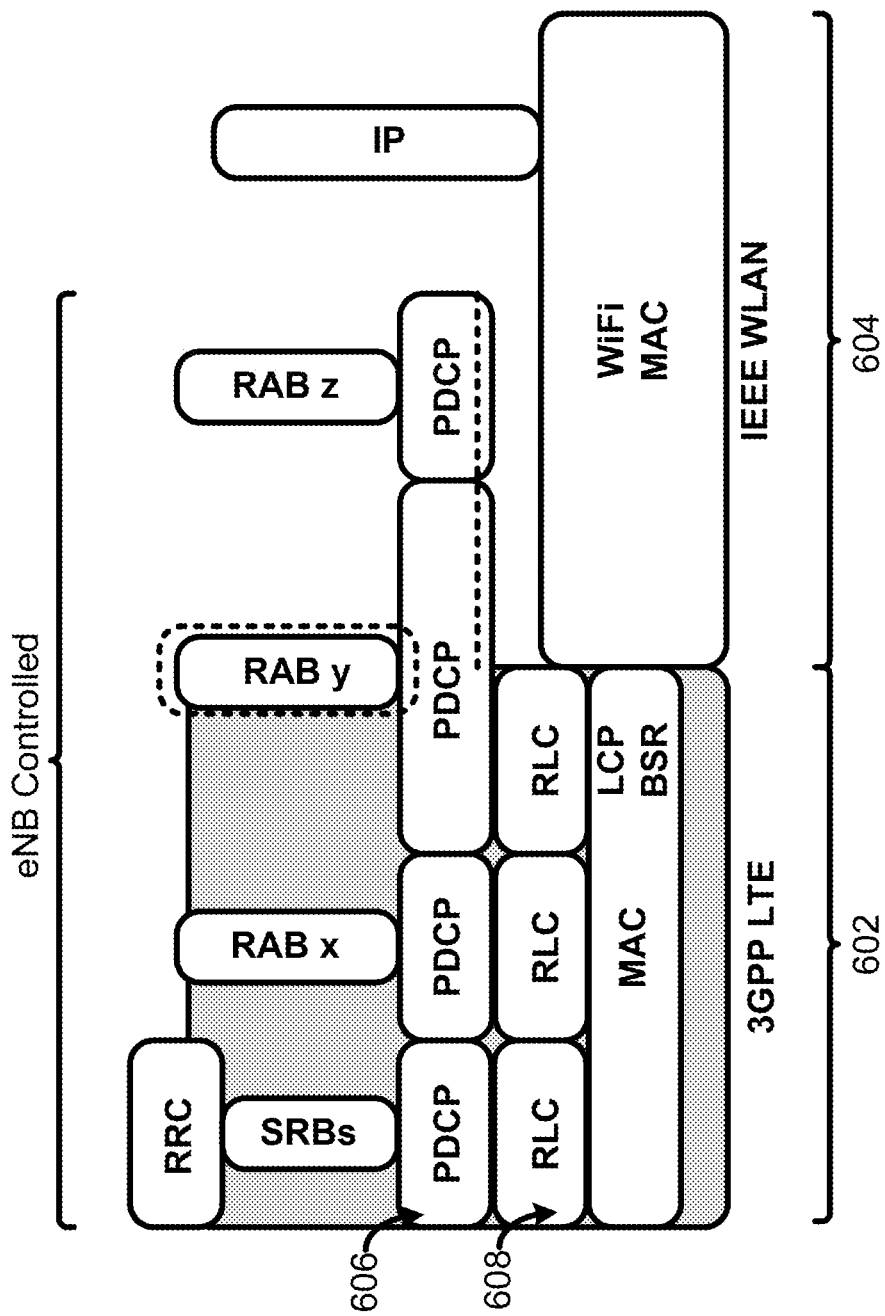
FIG. 6 is a diagram illustrating a physically separated WLAN AP and base station that are connected with standardized interface.

Referring now to FIG. 6, a diagram illustrating a physically separated WLAN AP 604 and base station 602 that are connected with standardized interface is shown. In one possible deployment scenario, from the perspective of the network, the implementation of the plurality of radio accesses (e.g., LTE eNB and the WLAN AP) may be physically separated and at least some coordination in-between may be facilitated using a standardized interface.

In this case, from the WTRU's perspective, the modelling of the user plane may include support for bearers being associated with a plurality of radio accesses, possibly in addition to supporting bearers associated to a single radio access. This may be similar in principle to handling WiFi connectivity as a Secondary Cell Group (SCG) of the WTRU's configuration. Such modelling may then include support for transmitting data associated to a bearer using the plurality of radio accesses but possibly treated as separate transport branches from the perspective of layer 2 protocols.

Specific restrictions for certain traffic and/or certain bearers may be introduced by configuration. For other bearers, dynamic methods may be used for determination of uplink routing. Such restrictions and/or methods may have further impacts to MAC functions, such as the Logical Channel Prioritization (LCP) procedure, and/or the Buffer Status Reporting (BSR) procedure and/or BSR signaling. In addition, functions and services no longer provided by the RLC layer 608 may impact PDCP 606 and/or other aspects of the user plane transport.

Figure 7:
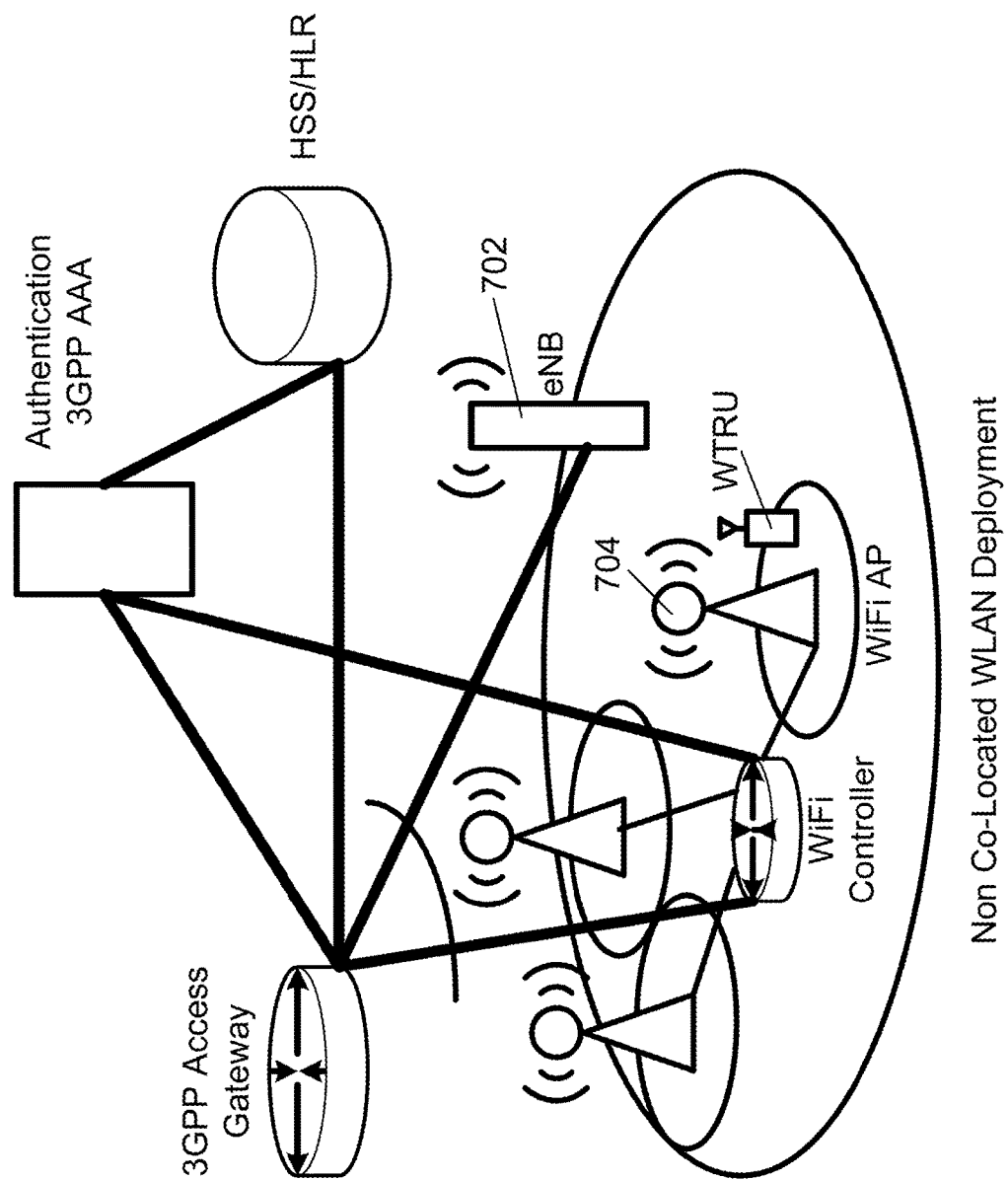
FIG. 7 is a diagram illustrating physically separated WLAN AP and base station that are not connected with an interface is shown.

Referring now to FIG. 7, a diagram illustrating a physically separated WLAN AP 704 and base station 702 that are not connected with an interface is shown. In one possible deployment scenario, from the perspective of the network, the implementation of the plurality of radio accesses (e.g., LTE eNB and the WLAN AP) may be physically separated and coordination in-between may be either very limited or non-existent.

In such case, from the WTRU's perspective, the modelling of the user plane may be such that the L2 of each respective radio access remains unchanged. Instead, additional control plane procedures and/or behavior associated to the first radio access may be used, for example, to provide additional control for bearers associated to the second radio access.

The modelling of the interactions, if any, between the different radio interfaces may impact the realization of the integration of such interfaces. For example, additional WTRU behavior may be required if little (or no) interaction is possible between the LTE implementation and the WiFi implementation. In addition, while some implementation-based interactions may be possible, it may be challenging to coordinate and define such as part of a standardized component. One issue that may need to be addressed from the perspective of the LTE implementation is the impact of the different possible levels of opacity from the WiFi interface.

Protocol adaption and enhancements may be needed. When protocols of a first radio access are carried over a second radio access, there may be a need to perform some form of adaptation. Additional functions in the protocol layers of the first radio access may also be needed, at least to compensate for services that may no longer be provided by the underlying transport.

For example, when the protocol split occurs within or under PDCP, additional functions may be required in the PDCP layer to compensate for the absence of the services provided by LTE RLC and/or to interact with the services provided by another radio interface of a different access type (e.g., WiFi).

For example, when data may be exchanged using either the LTE or the WiFi interface, additional functions or modifications of existing functions may be needed in the LTE MAC entity. Data associated to uplink split bearers may lead to modifications to the Buffer Status Reporting (BSR) mechanism, the Scheduling Request (SR) mechanism, and/or the Logical Channel Prioritization (LCP) function.

Adaptions in support of scheduling and quality-of-service (QoS) may be needed. One objective of a scheduler (e.g., in the eNB for LTE) is to provide a certain level of QoS. When a WTRU can transmit data traffic using one of a plurality of radio interfaces, scheduling aspects may need to be addressed.

For example, functions to determine the rate at which the WTRU may allocate data for transmission using the WiFi interface and/or to perform the retransmission of data previously assigned to the WiFi interface may be required. Such functions may be applicable to PDCP and/or to MAC, depending on the modeling of the interaction between the applicable radio interfaces. If the first radio access technology may be used to dynamically adapt to possible variations in terms of transmission rate for the second radio access technology, additional behavior and/or scheduling information may be required in the first radio access technology.

Additional aspects related to QoS may need to be addressed. When protocols of a first radio access technology are carried over a second radio access technology, there may be a need to determine the impact of the second radio on the QoS levels of the associated bearer.

For example, for QoS-related aspects using LTE as the first radio access technology and WiFi for the second radio access technology, one approach may be to consider that the eNB is expected to ensure that all configured DRBs can meet their, expected QoS. However, the eNB may not have means to control or to predict the performance of the traffic transported using WiFi. One question then becomes how to overcome this if more than a Best-Effort QoS is to be supported when offloading data traffic using WLAN.

If LTE PDCP is carried over a WiFi radio interface, a discard timer configured for such bearer may no longer entirely serve its intended function. The discard timer may be related to some form of minimum latency guarantee (and transmission rate, in some cases) from the eNB scheduler. The eNB scheduler may relate new data arrival (or buffer fill rates) from the reception of a BSR with the configured discard timer and the scheduling instructions for the concerned WTRU. Similarly, the discard timer may serve additional functions, such as, for example, an indication that the second radio interface is either improving or degrading based on time spent in the PDCP's buffer.

Aspects of Buffer Status Reporting (BSR) and Logical Channel Prioritization (LCP) may need to be considered. If one bearer is selected to be offloaded to WiFi, the bearer configuration remains at the WTRU LTE module even if there may be no data of that bearer transmitted over LTE Uu interface. The UL and DL data of the bearer may be carried on the same WiFi interface, or they may be carried on different interface (e.g., DL on WiFi and UL on LTE, or UL on WiFi and DL on LTE). In any case, if the UL data is carried on WiFi interface, the BSR reporting should be adjusted to reflect the real demand for resources. Moreover, the LCP procedure should also be enhanced to distribute the assigned resources among bearers in a fair and efficient way.

If the LTE/WiFi aggregation is per-application flow instead of per-bearer (e.g., for one bearer, some traffic may be carried on WiFi while other traffic remains on LTE) it may become more complicated for the BSR and LCP.

The routing of traffic between radio interfaces may need to be addressed. A WTRU that can transmit data traffic using one of a plurality of radio interfaces may have to determine what interface to use according to a number of criteria.

There may be one or more methods of selecting traffic for WiFi aggregation. There may be three levels of traffic granularity that can be possibly achieved for WiFi aggregation. It may be done on a per-PDN basis; all the traffic that belongs to a PDN connection may be carried either on E-UTRAN or WLAN access network. It may be done on a per-EPS Bearer basis; all the traffic that belongs to an EPS bearer may be carried either on E-UTRAN or WLAN access network. It may be done on a per-application flow basis; all the traffic that belongs to an application may be carried either on E-UTRAN or WLAN access network.

Because multiple applications that share the same QoS characteristics can be carried on the same EPS bearer (or Data Radio Bearer), per-application WiFi aggregation means that some flows that originally belongs to a DRB may now be offloaded from the eNB to the WiFi access network and others may remain on the original DRB. The DRB may actually be "split" in the eNB into two different access networks.

There may also be many factors that may decide whether a PDN/bearer/application can be carried on WiFi access network. One factor may be user preferences; the user or applications may have settings like "always use WiFi (or cellular) when available", "prefer WiFi (or cellular)", etc. Another factor may be ANDSF rules; WTRUs supporting ANDSF may have access network selection and traffic steering polices like ISMP and/or ISRP to determine the priority of access network for services or applications. Another factor may be PDN offloadability; in the RAN-rule based WiFi offloading mechanism defined in R12, the network may indicate "WLAN offload acceptability/applicability" for PDN connections.

Besides these factors, criteria that are related to the Bearer-level characteristics, such as QoS-based criteria, may also come into play when the per-bearer offloading becomes possible in this LTE/WiFi aggregation scenario. With all these possible factors that could determine what PDN/bearer/application flow that eNB should choose to apply LTE/WiFi aggregation, a proper rule may need to be defined to ensure a reasonable and optimal decision can be achieved in terms of user experience, and consistent WTRU/NW behaviors can be expected from different vendors of devices.

Traffic recognition on the WiFi interface may need to be addressed. When the LTE/WiFi aggregation has been activated for a WTRU, it may receive the data split from the eNB on the WiFi interface. It may also receive on the WiFi interface other data that is not split from the eNB. For example, the WTRU may have activated other WiFi offloading mechanisms such as MAPCON or IFOM so it may receive data offloaded from EPC; or it may directly access Internet via WiFi in a non-seamless way without involving the LTE network.

When the WTRU receives the data split from the eNB, further treatment may be needed before it can be forwarded to the application layer. For example, if the data split occurs at the PDCP layer, the received packets may need to be forwarded to the correct PDCP entity at the WTRU. Further PDCP functions, such as decompression and decryption may need to be performed there. This requirement may raise the issue of how the WTRU can differentiate the WiFi packets that are split from eNB froth the packets received from other sources, and how to relate those packets to the correct logical channels.

Network-based support for integration of different radio accesses may need to be addressed. An aggregation event notification may be provided to the CN nodes. In this LTE/WLAN aggregation scheme, the data split and offloading occurs at the eNB and it may seem unnecessary for other CN nodes such as PGW/SGW, MME, PCRF to be aware of the aggregation operation at the eNB. However there is at least one compelling reason, the charging considerations, that the system nodes beyond eNB should also be involved when the aggregation/offloading occurs.

It's usually the case that the traffic offloaded to the WLAN should not be charged at the same rate as when it is carried over LTE Uu. Because the charging is enforced at PCEF (PGW) or TDF (Traffic Detection Function), these nodes should be notified of the event when the aggregation is activated or deactivated.

The embodiments are described taking into account different possible approaches to the interactions between both access technologies. In a wrapper approach, a policing-based operation may be used, wherein one or more WiFi aspects are integrated with LTE as a "black box." In this case, the first access technology (e.g., LTE) may be implemented to act as a container for the second access technology (e.g., WiFi). For example, a function that may not be available and/or implemented in the second access technology may instead be enforced and supervised in the first access technology. In this embodiment, the eNB may not control functions of the WLAN AP.

In a direct access approach, a direct access approach may be used, wherein one or more aspects of the WiFi communication is integrated with the LTE as a "white box." In this case, the first access technology (e.g., LTE) may be implemented to interact with the second access technology (e.g., WiFi). For example, the first access technology may have access (e.g., based on implementation aspects such as primitives) to information and/or notifications associated to a function that may be available and/or implemented in the second access technology.

Any of the above approaches may be implemented for different combinations of functions.

The embodiments are also described taking into account different possible arrangements in terms of where in the protocol layers and/or where in the implementation the different embodiments may be introduced.

A number of different metrics may be used to support the above approaches. In an embodiment, the WTRU may calculate and/or maintain one or more metrics related to the operation using the combination of a LTE interface and a WiFi interface. For example, the WTRU may maintain a number of metrics related to the WiFi interface, such that those may be available to LTE operation. Such metrics may be derived by observation (e.g., when using the policing-based operation) or by using information provided by the WiFi component (e.g., when using the primitive-based approach). The WTRU may use the metrics to enhance existing functions and/or to implement new behavior (e.g., related to LTE QoS and/or scheduling).

The WTRU may perform one or more of the following functions using the various metrics. The WTRU may compensate for variations in WiFi performance by, for example, inducing modifications to routing and/or prioritization of uplink data and new triggers for Scheduling Requests (SRs), or the like. The WTRU may report additional uplink scheduling information to the eNB by, for example, inducing modifications to the BSR calculations (including contents), variable reporting mechanisms, or the like. For example, the WTRU may report additional uplink scheduling information, using mechanisms described herein, to the eNB when it may not perform WiFi-related measurements timely enough to perform offloading decisions, such that required QoS may not be impacted negatively.

The metrics used may be absolute values, instant values, or average values over a configurable period of time. For example, the WTRU may maintain a state that may be based on one or more metrics such as those described further below. The state may be averaged over time using a duration that may be configured. The duration may be useful to determine the reactiveness of the initiation of further WTRU behavior. Example metrics may include absolute values, instant values, or average values calculated over configurable periods of time.

The metrics may be used to trigger additional reporting and/or corrective actions. This behavior may include the reporting of uplink or downlink scheduling and or status information, as well as other (possibly corrective) actions such as those described herein.

In general, the metrics may include quantities such as output power, number of transmitted data units and/or data unit bits, number of transmissions attempts, number of data units transmitted, number of initial transmissions attempts, the sum of the size of the transmitted data units, the average amount of time and/or transmission attempts per associated aspect, or the like. The quantities may be accumulated or averaged over a period of time that may be configurable. The WTRU state may also be expressed as a remaining amount of these quantities to be available, or to be served for the given duration.

The metrics may be associated and/or maintained per interface, per route, and/or per type of Radio-Access Technology. In an embodiment, the metrics may be maintained only when the WiFi interface is configured, and possibly, also when activated.

The WTRU may maintain some state for one or more of the metrics described herein.

One category of metrics may be related to guarantees in terms of service quality. The WTRU may maintain a quantification of one or more aspects related to QoS. The aspects may include one or more of the following.

One aspect may be a transmission rate, or a change thereof by a specific amount. For example, the WTRU may maintain a value for a transmission rate for a given aspect. The value may represent the observed rate for the concerned aspect. The WTRU may additionally be configured with a value as a threshold value for the purpose of comparison. The transmission rate may be applicable for uplink transmission (e.g., in support of the determination of the applicable interface for transmissions and/or the determination of the amount of data to route to a specific interface). The transmission rate may be applicable for downlink transmission (e.g., in support of reporting procedures for the purpose of estimation of interface quality).

The transmission rate may be applicable to the combined transmissions across the WiFi interface (e.g., rate per interface). For example, the WTRU may maintain a separate value for a given bearer using a given interface for uplink transmissions (e.g., for the purpose of routing data for a split bearer in the uplink direction).

The transmission rate may be applicable to the combined transmissions across the plurality of interfaces. For example, the WTRU may maintain a value for a given bearer across both interfaces for downlink transmissions (e.g., for the purpose of reporting observed rate to the eNB).

The transmission rate may a prioritized bit rate (PBR). For example, the WTRU may be configured such that data associated with a given bearer (or for a plurality thereof) may be transmitted using the WiFi interface. In an embodiment, the WiFi interface may serve the applicable bearers, at least up to the configured PBR.

The transmission rate may be a guaranteed bit rate (GBR). For example, the WTRU may be configured with a minimum rate value at which a bearer (or a plurality thereof) may be served. This rate may be served by the WiFi interface only (e.g., for routing of traffic in the uplink), or using the combination of a plurality of interfaces (e.g., for reporting observed rates in the downlink).

The transmission rate may be a maximum bit rate (MBR). For example, the WTRU may be configured with a maximum bit rate value at which a bearer (or a plurality thereof) may be served. In an embodiment, this rate may be served by only one of the plurality of interfaces configured for the WTRU. For example, the MBR may be configured such that it is applicable to transmissions associated with the LTE interface. Any data exceeding the MBR may be a candidate for offloading to the WiFi interface. In this case, if the WTRU determines that the other interface is not sufficient for the amount of data exceeding this rate, it may determine that the value is not meeting the threshold.

In another example, the MBR may be configured such that it is applicable to transmissions associated with the WiFi interface. Any data exceeding such rate may be considered to overshoot the offload 'capability of the interface. In this' case, the WTRU may consider the excess data as a candidate for transmission (including for buffer status reporting) using the LTE interface, and/or it may determine that the value for this metric is not meeting the threshold. Similar approaches may be used for other rate-based metrics (e.g., PBR, GBR and APN Aggregate MBR).

The transmission rate may be an APN Aggregate MBR (A-AMBR). For example, the WTRU may be configured with a maximum bit rate value at which a bearer (or a plurality thereof) may be served. The plurality of bearers may correspond to a single APN. The bearers may consist only of non-GBR bearers. The rate may be served by only one of the plurality of interfaces configured for the WTRU. The A-AMBR may be applicable to a specific bearer, to a group of bearers (e.g., based on configuration, the associated priority, or the associated LCG), to a bearer type (e.g., to one or more GBR bearers, non-GBR bearers, split bearers, or WiFi-only bearers). The A-AMBR may be interface-specific (e.g., such as the available transmission rate for the WiFi interface). In this case, the associated threshold value may be a target transmission rate of the WiFi interface.

The transmission rate may be an error rate, or a change thereof. For example, the error rate may be a packet error rate (PER), a packet loss rate (PLR), an average number of retransmissions, or the like. The WTRU may use indications from the WiFi interface (e.g., for the uplink error rate) and/or sequence numbering information (e.g., observed from reception of PDCP PDUs on the WiFi interface or as indicated in a status report for PDUs associated to the WiFi interface) to determine what packets may be missing. Alternatively, the error rate may be an absolute number of missing packets, consecutive or not, possibly within a transmission/reception window.

For example, the WTRU may maintain a value for a packet loss rate for a given aspect. The value may represent the observed rate for the concerned aspect. The WTRU may additionally be configured with a value as a threshold value for the purpose of comparison. The rate may be applicable for uplink transmission (e.g., in support of the determination of the applicable interface for transmissions and/or the determination of the amount of data to route to a specific interface). The rate may be applicable for downlink transmission (e.g., in support of reporting procedures for the purpose of estimation of interface quality).

This aspect may be applicable to a specific bearer, a group of bearers (e.g., based on configuration, the associated priority, or the associated LCG), or a bearer type (e.g., to one or more GBR bearers, non-GBR bearers, split bearers, or WiFi-only bearers).

The aspect may be interface-specific (e.g., such as the available transmission rate for the WiFi interface. In this case, the associated threshold value may be a target transmission rate of the WiFi interface.

Another category of metrics may be related to transmission aspects of applicable data units. One of these transmission aspects may be a packet data-related metrics, such as timing aspects.

A timing aspect may be a SDU discard timer, which can be an average, a worst-case, a change in average, a head-of-line value. In an embodiment, the WTRU may determine whether such value is below or above a threshold. The SDU timer may be configured for a given bearer according to legacy procedures. The WTRU may maintain one or more of the following values.

The WTRU may maintain a value that represents the average remaining time for all SDUs for which the WTRU has assigned and started a timer. The timer may be set to an initial non-zero value and decreased with time. The average may be calculated according to at least one of the following parameters.

The average may be calculated based on all SDUs during a given period. The WTRU may consider all SDUs in the WTRU's buffer that are associated with a timer during the period (e.g., the average remaining time at the time of the calculation independently of transmission state). This metric may combine the effect of successful transmissions (i.e., the value of the timer when stopped due to successful transmission) and the effect of SDUs on pending transmissions (i.e., the more the number of SDUs close to critical value the lower the average).

The average may be calculated based on SDUs still pending. The WTRU may consider only SDUs in the WTRU's buffer that are associated with a timer during the period the timer is running (e.g., average remaining time at the time of the calculation for SDUs that are still pending). This metric may approximate the amount of time remaining for SDUs that are still pending.

The average may be calculated based on SDUs removed from the buffer, which may be the interface-specific buffer. The WTRU may consider only SDUs in the WTRU's buffer that are associated with a timer during the period the timer is not running (e.g., the timer has been stopped/elapsed during the period, or the average remaining time for SDUs for which transmission has stopped, whether the transmission was successful or not). This metric may approximate the amount of time remaining when a SDU is removed from the buffer.

The average may be calculated based on SDUs not yet submitted for transmission. The WTRU may consider SDUs that have not yet started transmission that are associated with a timer during the period the timer is running. This metric may approximate the average amount of time remaining for SDUs still being queued and not yet undergoing transmission (e.g., a smaller value may indicate higher congestion).

The average may be calculated based on SDUs submitted for transmission, but still pending. The WTRU may consider SDUs that have started transmission that are associated with a timer during the period the timer is running. This metric may approximate the average amount of time remaining for SDUs when the WTRU submits them for transmission over a given period (e.g., a smaller value may indicate higher congestion).

The average may be calculated based on SDUs that completed transmission during the period (whether they were successful or not). The WTRU may consider SDUs that have completed transmission during the period. This metric may approximate the average amount of time remaining for SDUs when the WTRU complete the transmission process for the corresponding PDU.

The WTRU may maintain a value that represents the average elapsed time for all SDUs for which the WTRU has assigned and started a timer. For example, the WTRU may maintain a value similar to any of the above, but may be calculated as elapsed time (e.g., the difference between the initial timer value and the current timer value). In other words, the average may represent the average time that has elapsed.

The WTRU may maintain the change in the above averages. For example, the WTRU may consider the change in average for values similar to any of the above.

The WTRU may maintain a worst-case scenario. For example, the WTRU may consider a SDU that is associated with a timer that is still running and that has the smallest remaining value at the time of the determination of the concerned metric.

The WTRU may maintain a head-of-line delay. For example, the WTRU may consider the SDU that is next in sequence for transmission, or the oldest unacknowledged SDU. In an embodiment, this may only be done for a SDU with a timer still running. The WTRU may determine the time spent in the WTRU's buffer for this SDU. The time may be based on the associated timer if the timer is still running.

The WTRU may maintain a number of SDUs for which the timer has elapsed entirely. The WTRU may consider the amount, either cumulative (e.g., since the last reconfiguration/reporting event), or per given period, of SDUs for which the timer has entirely elapsed. These SDUs may have been handed over to the other interface for retransmission or they may have been discarded.

The WTRU may maintain any of the above for a period that may be configured. The WTRU may maintain any of the above only for SDUs associated to the WiFi interface.

The WTRU may be configured with a SDU Retransmission Timer as described herein. The timer may be configured for a given bearer. In an embodiment, the time may be configured for a given interface (e.g., the WiFi interface). Similar values to those described above for the SDU Discard Timer may be considered.

Another packet data-related metric may be sequencing aspects, which may include a Sequence Number (SN) gap. For example, the WTRU may determine the difference between sequencing information associated with two SDUs (or PDUs) that are themselves associated to the same sequence. Such sequencing information may correspond to the PDCP SN.

In an embodiment, the sequencing may be only for SDUs (or PDUs) associated with a given interface. For example, for split bearers, the WTRU may count the number of SDUs/PDUs missing in a sequence that are associated with the WiFi interface.

The sequencing may be based on the distance between the sequencing information of two different SDUs/PDUs. For example, the WTRU may determine the distance between the most recent PDU received with the highest SN and the oldest PDU received in-sequence (or first missing PDU). This may be done in a receive window for downlink transmissions.

For a split bearer, this metric may indicate increasing difference in performance between the two interfaces as the gap size increases. For example, the WTRU may determine the distance between the last PDU for which it initiated transmission and the oldest unconfirmed (or unacknowledged) PDU. This may be done in a transmission window for uplink transmissions.

In an embodiment, this metric may be maintained for all transmissions across a given interface. In an embodiment, this metric may be maintained only for split bearers. In an embodiment, this metric may be maintained only per direction (uplink or downlink). For example, when maintained for all downlink transmissions for split bearers, an increasing value may indicate an increasing difference in performance between the two interfaces.

Another packet data-related metric may be feedback aspects, which may include a PDCP status report (SR). For example, the WTRU may determine sequencing aspects as per the above when it receives a status report that acknowledges or negatively acknowledge one or more SDUs/PDUs. The size of PDCP SN gap may relevant. For example, the WTRU may determine sequencing aspects, as described above, for downlink operations of split bearers using sequencing information for SDUs/PDUs received over the LTE interface and for those received over the WiFi interface. This may enable an estimation of the difference in packet rate between both interfaces for a given bearer or in total.

Another packet data-related metric may be duplicate detection. For example, the WTRU may perform (or receive) retransmissions of unconfirmed data units using a different interface than for the initial transmission. The WTRU may determine that a number of duplicate data units have been received or transmitted (e.g., based on received status reports). Duplicates may indicate that the interface used for the initial transmission is experiencing excessive transmission delays (e.g., delays above an expected delay) due to, for example, a higher number of retransmission attempts and/or higher access latency than expected.

Another category of metrics may be related to data applicable for transmission at least in part using WiFi. One of these metrics may buffer/queuing-related metrics, such as a buffer fill rate. The WTRU may consider the rate at which the buffer is filling. The rate may be estimated by calculating, for a given period, the rate of arrival of the data for uplink transmission in the WTRU's buffer minus the rate of removal for transmission from the WTRU's buffer. The buffer may be a buffer associated with a split bearer, for the part to be transmitted over the WiFi interface, a buffer associated with a WiFi-only bearer. The buffer may be all buffers associated with a WiFi interface. The buffer fill rate may correspond to an estimated transmission rate, such as any of the rate control embodiments described herein, minus the actual rate of transmission for the WiFi interface.

Another buffer/queuing-related metric may be buffer emptying rate. The WTRU may maintain a value similar to the buffer fill rate described above but from the perspective of how well the WiFi interface drains the concerned WTRU buffers.

Another buffer/queuing-related metric may be variation in empty/fill rate. The WTRU may consider variations of a buffer fill rate and/or a buffer emptying rate.

Another buffer/queuing-related metric may be average time in buffer/delay. Similar to timer-based embodiments described above, the WTRU may consider different average or absolute time or delay values related to buffer occupancy.

Another buffer/queuing-related metric may be head-of-queue delay. Similar to timer-based embodiments described above, the WTRU may consider different average or absolute head-of-queue delay values related to buffer occupancy.

Another category of metrics may, be related to the performance/load/availability of the WiFi radio link. One of these performance/load/availability metrics may be an interface-related metric. The interface-related metric may include a number of parameters. One parameter may be link quality determined by, for example, measurements or PER.

Another parameter may be the transmission rate, which may include: average transmission rate, instantaneous transmission rate, and the change in such rate.

Another parameter may be timing aspects, which may be described below. One timing aspect may be access latency. The WTRU may consider the time required between the transmission of a data unit is initiated until the WTRU may first perform the initial transmission for the data unit. In an embodiment, the WTRU may consider the time until it successfully completes the transmission of the data unit. A higher load on the WiFi interface may lead to higher access latency.

Another timing aspect may be medium reservation. The WTRU may consider the time required to acquire the medium or the time during which it may reserve the medium for transmission.

Another timing aspect may be backoff time and/or average backoff time. The WTRU may consider the average backoff time for a given period or for the transmission of a given data unit (e.g., per transmission value) for the WiFi interface.

Another timing aspect may be average time of data in buffer/transmission delay. The WTRU may consider the average time during which a data unit is available for transmission using the WiFi interface until the initial transmission is performed or until the transmission successfully completes.

Another timing aspect may be head-of-queue delay. The WTRU may consider the delay experience by the oldest data unit available for transmission using the WiFi interface. In an embodiment, this may be done for a pending data unit. In an embodiment, this may be done for data units with the highest value for a given period.

Another parameter of the interface-related metrics may be a load aspect. The WTRU may consider at least one of the following: an estimated load for the WiFi access or a change in such estimated load; a rate of contention loss/success for contention-based access; and an average time to win contention.

Other parameters of the interface-related metrics may be estimated transmission rate and insufficient available transmission power.

The metrics above may be calculated by observation, as in the black box approach, or they may be indicated by the WiFi component, as in the white box approach. For any of the above, the WTRU may determine a value based on observations of the concerned buffers, data arrival, transmissions, feedback received, indications received from the WiFi interface, or the like.

The metric-related information may be accumulated from a specific point in time over a determined period. In an embodiment, the information may be based on events that occurred since any one of the following: the transmission or the reception of the last uplink control information, the transmission or the reception of the last status report (e.g., PDCP SR), the last reconfiguration that impacted transmissions over the WiFi interface, or the activation of the WiFi interface. It should be noted that this is not limiting and may include any metric-related information which may be accumulated from a specific point in time or over a period.

When the value of one of the metrics above reaches a threshold, it may lead to the WTRU reporting triggering or recovery actions. For example, the WTRU may initiate further behavior when the value maintained for one or more of the above metrics increases beyond (or decreases below) a configured threshold. Such further behavior may consist in initiating reporting, such as for the concerned metric and/or for additional metrics. The further behavior may consist in recovery behavior (e.g., initiating retransmissions) or other behavior, such as changing a state (e.g., an association with a radio interface, a state of activity) associated with the aspect applicable to the concerned metric (e.g., a bearer, a group of bearers, or an interface), and/or initiating recovery actions.

The following is an example with a per-bearer or per-group of bearers value for any such metric. The WTRU may maintain a metric, such as the ones described above, for a single bearer, for a group of bearers or for all bearers of the WTRU's configuration. This may be a configuration aspect for the concerned bearers. Related logic to determine how to route data in the uplink may be applied corresponding to the embodiment used to maintain the value associated to the concerned metric.

For example, the WTRU may maintain a per-bearer value for a metric for a bearer associated with a plurality of interfaces (e.g., a bearer for which data may be transmitted using either a WiFi interface, an LTE interface, or both). Alternatively, the WTRU may maintain the metric per subset of a plurality of bearers. For example, the metric may be maintained for all bearers that are associated with a plurality of interfaces. Alternatively, the metric may be maintained for a group of bearers that have been grouped using the logical channel group (LCH) that is configured by the base station. The LCH may be a LCH that is further configured as "WiFi offloadable," such that data associated to the LCH may be transmitted using a plurality of interfaces.

The following embodiments may address timing aspects for data transport over multiple radio interfaces, and more specifically, when the WTRU should determine what/how much data to offload.

The following embodiments may be used, for example, in the uplink (e.g., from PDCP buffers to WiFi buffers). The WTRU may determine that data is available for uplink transmission (e.g., when data, such as PDCP SDUs, arrives in the PDCP buffer) for a bearer for which at least some data may be transmitted using WiFi, and may make the data available to the WiFi component for transmission. The data may be placed in the WiFi transmission buffers as, for example, PDCP PDUs according to at least one of the following parameters.

The timing of the offload may be based on one or more implementation aspects. One implementation aspect may be a callback function. The WTRU may make data units available to WiFi when the WiFi component requests data. The request may include activation of the WiFi interface and may be initiated by the WiFi component. With respect to the amount of data, the request may be made in terms of amount of data. For example, for contention-free resource assignments, the WiFi component may periodically request a certain amount of data corresponding to the available resources. With respect to First In First Out (FIFO)-like queuing, the request may be performed in terms of acknowledgement of successful transmission for data units that was previously made available to WiFi. The WTRU may make available one or more, in case of rate-based control, new data units (if available) for every acknowledgement received from the WiFi interface that indicates that a data unit was successfully transmitted.

One implementation aspect may be based on periodicity. The WTRU may determine whether or not it should make data units available to WiFi once for every given period. The period may be a configurable aspect. The period may correspond to the Transmission Time Interval (TTI) of the LTE interface (e.g., 1 ms). The period may correspond to a longer duration (e.g., when rate-control is used to determine how much data to make available to WiFi).

One implementation aspect may be event-driven. The WTRU may determine whether or not it should make data units available to WiFi at times corresponding to specific events. The event may be activation of a WiFi interface. The event may be availability of new data for transmission in the PDCP's buffer. For example, the WTRU may determine that new data is available for transmission and determine, based on rate control, that some data should be made available to WiFi. For example, the WTRU may determine that data may be made available to the WiFi component when it receives a status report that indicates that the transmission window associated to the WiFi interface may be advanced.

One implementation aspect may be based on activation state. The WTRU may determine whether or not it should make data units available to WiFi only when WiFi is activated and/or when some specific metric (e.g., available data rate, link quality) meet a specific condition.

The following embodiments may address the selection of data for offload, and more specifically, how the WTRU determines what data to offload.

One approach may be network controlled uplink routing. The WTRU may determine whether a data unit should be transmitted using the LTE interface or the WiFi interface according to at least one of the following parameters.

The reception of downlink control signaling (e.g., L1/PDCCH, L2/MAC or L3/RRC) may be described herein. For each alternative below, the WTRU may apply such routing information no later than (or starting from) a specific time after the successful reception of the PDSCH transmission in subframe n (e.g., at n+x ms).

For L1/PDCCH, the WTRU may receive a DCI on PDCCH that indicates routing information. Possibly, the control information may include at least one index. The index may correspond to at least one of the following: a configuration, a specific bearer (or a type thereof), or a group of bearers.

The DCI may be decoded using a RNTI value configured to this purpose. Such RNTI may be used to decode DCIs on PDCCH when the WTRU is configured for operation with the WiFi interface. The WTRU may transmit HARQ A/N to acknowledge successful reception of such control signaling. In this scenario, the value of x may be equal to 4 ms, and n may be the subframe in which the WTRU received the control signaling or the subframe in which the WTRU transmitted the HARQ A/N feedback (if any) for the control signaling.

For L2/MAC, the WTRU may receive a MAC Control Element (CE) on PDSCH that indicates routing information. The MAC CE may be a MAC activation/deactivation CE where the WiFi interface is considered as a SCell in the bitmap signaled inside the MAC CE. Additional fields may be introduced for other aspects, such as those described below. Possibly, the control information may include at least one index. The index may correspond to at least one of the following: a configuration, a specific bearer (or a type thereof), or a group of bearers. The value of x may be equal to 4 ms, and n may be the subframe in which the WTRU received the PDSCH transmission containing the MAC CE or the subframe in which the WTRU transmitted the HARQ A/N feedback (if any) for the PDSCH transmission.

For L3/RRC, the WTRU may receive a RRC signaling on PDSCH that indicates routing information. Possibly, the control information may include a configuration of the type of bearer and/or path information (e.g., a mapping of the uplink and/or the downlink traffic to a specific interface). The value of x may be equal to the RRC processing time (e.g., in the order of 10-20 ms, depending on the procedure used), and n may be the subframe in which the WTRU received the PDSCH that contains the control signaling or the subframe in which the WTRU transmitted the HARQ A/N feedback (if any) for the PDSCH transmission.

For any of the above, control signaling may indicate at least one of the following: activation (or deactivation) of the WiFi interface, or activation (or deactivation) of the WiFi branch for one or more split bearers. The routing information may be for a specific direction only (i.e., the downlink or uplink directions may have asymmetric operations), or for both directions (i.e., the uplink and downlink may have symmetric operations).

For any of the above, a configuration may include and/or correspond to a set of metrics and/or associated values related to applicable bearers, rate control parameters, or the like. The configuration may correspond to a set of bearers for offload to WiFi. The configuration may include and/or correspond to a type for the applicable bearers (e.g., offloading as split bearers, offloading as WiFi-only bearers, or offloading using embodiments described herein for rate control and for retransmissions).

For any of the above, the WTRU may initiate the transmission of control signaling (e.g., HARQ NACK on PUCCH, MAC CE on PUSCH, or L3 RRC message) to indicate whether or not the WTRU can comply to the control signaling. For example, the WTRU may not comply if it determines that one of the metrics as described herein does not meet a specific threshold (e.g., including a WiFi interface that is not active, not associated, not in range or with zero available rate) and that it may comply otherwise.

The above embodiments may be applicable per bearer, per bearer type (e.g., for split bearers only or for DRB type only), per group of bearers (e.g., per LCG), or for all data units or for specific type of data units (e.g., user plane traffic only).

From the network perspective, the base station may control the offload to WiFi using control signaling coherent with the above. The base station may determine how to route traffic in the uplink and/or in the downlink based on uplink scheduling information received from the WTRU, such as that described herein, and/or based on other control signaling received from the WTRU. The control signaling may include measurements (e.g., WiFi-related quantities), reporting of metrics such as those described herein, or feedback received from the WTRU using uplink LTE (e.g., CQI reports). The WTRU may transmit the CQI report by considering the WiFi interface as a SCell of the WTRU's configuration, where different codepoints may indicate one or more metrics such as those described herein.

Another approach may include WTRU-controlled uplink routing. One embodiment may include WTRU-autonomous UL routing as a function of one or more of the metrics described herein. For example, when a QoS aspect configured for a split bearer is no longer met, and that aspect reflects the impact of the WiFi interface (e.g., the access latency using the WiFi interface increases beyond a specific value), the WTRU may route corresponding data units to the LTE interface until the WTRU receives further control signaling from the network. The control signaling may be a reconfiguration for the concerned bearers, mobility control signaling for a change of WLAN AP, and/or control signaling that reactivates the WiFi branch for the concerned bearers. In an embodiment, the WTRU may operate autonomously until it determines that the any one of the above conditions reverses (e.g., the access latency has sufficiently decreased).

In another embodiment, the WTRU may be configured to perform routing of data units in the uplink as a function of a rate control function such as those described herein. For example, when a rate control function applicable to a split bearer indicates an insufficient available WiFi rate (e.g., the available WiFi rate is down to zero), the WTRU may route corresponding data units to the LTE interface until the WTRU receives further control signaling from the network. The control signaling may be a reconfiguration for the concerned bearers, mobility control signaling for a change of WLAN AP, and/or control signaling that reactivates the WiFi branch for the concerned bearers. The WTRU may operate autonomously until the WTRU determines that the condition reverses (e.g., the available WiFi rate increases above zero).

In another approach, the WTRU and the base station may be involved in the selection of uplink traffic for WiFi aggregation. In an embodiment, the WTRU may first determine which bearers are applicable to the LTE/WiFi aggregation from all the possible criteria that are already configured in the WTRU. The criteria may include, but is not limited to the user/application preferences, ANDSF policies, and/or PDN offloading applicability. The criteria may have predefined priorities so one criterion may override another when there is a conflict.

Fox example, the user/application preference of one application "A" may be "always use WiFi when available", but the ANDSF ISRP policy may indicate that LTE is the preferred access. In that case, the user/application preference may override the ANDSF policy as it has higher priority. A bearer may only be considered applicable to LTE/WiFi aggregation when all the application flows mapped to that bearer are allowed to be carried on WiFi after all the criteria and their priorities are taken into consideration. The application flows that mapped to a bearer may be indicated by the TFT/packet filters associated with a bearer. If no packet filter is found for a certain application flow, it may be mapped to a default bearer.

The following is an example of how a WTRU may decide whether a bearer is applicable to LTE/WiFi aggregation. Assume that there are two bearers B1, B2 within one PDN connection P1. Two applications App-1, App-2 are mapped onto B1, and two applications App-3, App-4 are mapped onto B2. The WTRU receives an indication from the MME that PDN connection P1 is applicable to WiFi offloading. App-1 has a preference that it always uses WiFi when available. Other applications don't have preference settings. The WTRU has an ISRP policy indicating that App-2 should prefer a LTE network, and App-3 and App-4 should prefer WiFi access network.

According to above various criteria, the WTRU should be able to determine that B1 bearer is not applicable to LTE/WiFi aggregation because one application (App-2) on it prefers cellular, and that B2 bearer is applicable because all the applications on it prefer WiFi.

As a second step, the WTRU may indicate to the base station its derivation result of bearer offloadability if it supports the LTE/WiFi aggregation feature. The per-bearer indication may be carried in the existing RRC messages such as RRCReconfigurationComplete or a new RRC message can be devised for this purpose. The WTRU may re-evaluate the bearer offloadability when a new application flow is mapped to or removed from a bearer. If the bearer offloadability is changed due to latest evaluation result, the WTRU may inform the base station of the change. The re-evaluation may be triggered by the ESM signaling (e.g., ModifyBearerContextRequest) that updates the UL TFT in the WTRU.

Alternatively the WTRU may indicate to the MME via NAS messages the result of bearer offloadbility. The per-bearer indication can be carried in the existing NAS messages such as ActivateDedicatedEPSBeaerConextAccept, ModifyEPSBearerContextAccept or a new NAS message can be devised for this purpose. After receiving this indication, the MME should forward the indication to the eNB in appropriate S1AP message such as WTRUContextModificationRequest or E-RABModifyRequest.

The eNB may solely depend on the bearer offloadability indication from the WTRU to choose the bearers to apply LTE/WiFi aggregation. It may also take into account other local policies or settings. For example, the eNB may have a local policy that limits the aggregation applicability to bearers of certain QoS characteristics or Logical Channel Priorities, such as "the bearers of QCI=1 or QCI=5 should not be offloaded to WiFi." In that case, even if the WTRU has indicated that bearers of QCI 1 or 5 are applicable, the eNB may not choose them to apply LTE/WiFi aggregation. The base station's local policy may be configured by O&M or it may receive such configuration over S1-MME interface from MME, which may derive such configuration from the user subscription data.

In another embodiment, the WTRU may first determine which application flows are applicable to the LTE/WiFi aggregation from all the possible criteria that are already configured in the WTRU. These criteria may include, but are not limited to, the user/application preferences, ANDSF policies, and/or PDN offloading applicability.

For example, there may be four applications currently running: App-1, App-2, App-3, and App-4. App-1 and App-2 may have an application preference for WiFi, and App-3 may have an application preference for cellular. There may also be an active ISRP rule indicating that App-2, App-3, and App-4 should consider WiFi higher priority. By taking all this information into account, the WTRU may determine that App-2 and App-4 are applicable for LTE/WiFi aggregation.

Similarly to the previous example, the WTRU may indicate the application flow offloadability to the base station in RRC messages, or to the MME in NAS messages, and the MME may forward the indication to the base station via S1AP procedures. The WTRU may identify the application flow in the RRC or NAS messages in the form of a packet filter. The base station may further downselect the application flows to apply LTE/WiFi aggregation based on local policies or settings.

After the application flows are identified to apply LTE/WiFi aggregation, the base station may construct a local per-WTRU filter to select the traffic for LTE/WiFi aggregation. If the aggregation occurs at PDCP or RLC level, each PDCP or RLC entity may need to have such filter function that can split data for different access networks.

The WTRU may also indicate which bearer is associated with the identified application flows, so that the base station can only configure the local filter function in the related PDCP or RLC entities only. Alternatively, together with the packet filters, the WTRU may also send its UL TFT configuration to the base station, either directly or via MME to base station signaling, so that the base station can figure out itself on which RBs those offloadable applications belong.

The following embodiments may address rate control for offloading data traffic. In an embodiment, state-based rate control may be used, which may include using any of On/Off state, activation/deactivation, and mobility/reconfiguration events, as a gating function. The WTRU may determine a state for the WiFi interface. For example, the state may correspond to an "On" or "Off" state, or an "Activated" or "Deactivated" state. The state may be modeled in the L3/RRC CONNECTED state for LTE and/or as a state of a radio resource (e.g., in the L2/MAC or the L2/PDCP).

In an embodiment, the state may be associated to a L3/RRC state for the WiFi interface (e.g., "WiFi Connected" state or "WiFi Idle" state). In such, case, the WTRU may receive L3 control signaling to perform state transitions. The WTRU may autonomously initiate other transitions based on metrics such as those described herein. For example, the WTRU may transit to a "WiFi idle" state when it determines that one such metric no longer meets a specific condition (e.g., the available data rate for the WiFi interface becomes zero). In this case, the WTRU may trigger additional actions such as reporting of uplink scheduling information or uplink status information as described herein.

In an embodiment, the state may be associated to a L2/MAC state for the WiFi interface, which may be similar to the activation/deactivation state of a SCell in LTE CA. In this case, the WTRU may receive L2 control signaling (e.g., a MAC Activation/Deactivation CE) to change the state. The WTRU may initiate other transitions based on metrics such as those described herein. For example, the WTRU may autonomously transition to a "Deactivated" state when it determines that a metric no longer meets a specific condition (e.g., the available data rate for the WiFi interface becomes zero). In such case, the WTRU may trigger additional actions such as reporting of uplink scheduling information or uplink status information such as those described herein.

The WTRU may implement additional states related to the WiFi interface. The state may be based on connectivity aspects of the WiFi interface (e.g., "Associated", "In-range, not associated", or "out-of-range"). States and other aspects may be reported as part of uplink scheduling information (such as described herein) or uplink status information (such as described herein).

State may be based on an ongoing procedure (e.g., WLAN AP mobility or, similar procedures) that may lead to interruption in transmission using the WiFi interface. In this case, the WTRU may consider that the WiFi interface is "unavailable" until transmissions become possible.

A state for which no transmissions are possible may be equivalent to a transmission rate equal to zero. Otherwise, the state may be equivalent to a non-zero transmission rate.

The WTRU may determine that it may offload data units to the WiFi interface for the applicable bearers as a function of a state, such as those described above. For example, the WTRU may determine that the WiFi interface is in an "On" state, such that any data available for transmission for the applicable bearer may be made available to the WiFi interface. Additional rate controls, such as those described further below, may be used in combination. In this case, the routing of uplink traffic may be performed as part of the PDCP entity or inside the MAC entity.

In an embodiment, semi-static split rate control may be used. This may be implemented as a configurable target rate in WiFi or as a semi-static split. The WTRU may be configured with a ratio to apply in order to control the amount of data to be transmitted using the WiFi interface and the amount of data to be transmitted using LTE. For example, the WTRU may be configured to make available for WiFi transmission 60% of the traffic while the remaining may be transmitted using the LTE interface. The rate may be expressed in terms of PDCP SDUs (or IP packets), PDCP PDUs (e.g., after any applicable header compression and/or encapsulation as PDCP data units), or in terms of bits (of PDCP SDUs or PDCP PDUs). The configuration may be per bearer, group of bearers, or for all data units. In an embodiment, the configuration may only be for bearers of a certain type (e.g., a split bearer, DRBs, and/or bearers carrying user plane traffic only).

The split ratio may be applied to LCP/PBR when WiFi is active or it may be applied to the function that split available data. For example, the ratio may be applied to a configured value of the Prioritized Bit Rate (PBR) for a split bearer when the WiFi interface is active. In this case, the routing of uplink traffic may be performed as part of the logical channel prioritization (LCP) function inside the MAC entity, or as part of a "Logical Interface Prioritization" function (e.g., inside a PDCP entity or a MAC entity such as described herein).

In an embodiment, target-based rate control may be used. The rate control function may set a target rate and the WTRU may monitor the operation of the WiFi interface to determine success/failure: It may be independent from the rate of the other interface and may be used in combination with gating and/or retransmission. The LTE interface may be used to compensate for any shortcoming using WiFi.

The WTRU may be configured with a target rate to apply to control the amount of data to be transmitted using the WiFi interface. The WTRU may make data available for transmission using the WiFi interface for the applicable bearers up to the target rate. The configuration may be per bearer, group of bearers, or for all data units. In an embodiment, the configuration may only be for bearers of a certain type (e.g., a split bearer, DRBs, and/or bearers carrying user plane traffic only).

The target rate may be applied to LCP/PBR when WiFi is active, and may impact LTE Prioritized Bit Rate (PBR). For example, the target rate may be applied as a PBR for a split bearer when the WiFi interface is active. The WTRU may determine the PBR part to be used for the LTE interface as the difference between the PBR value configured for the bearer and the target rate for WiFi for the concerned bearer. Alternatively, the PBR value may be set to a different value for the different branch of the split bearer. In this case, the WTRU may evaluate the amount of data to make available to the WiFi interface for the split bearer before evaluating the amount of data to transmit using WiFi.

In this case, the routing of uplink traffic may be performed as part of the logical channel prioritization (LCP) function inside the MAC entity, or as part of a "Logical Interface Prioritization" function (e.g., inside a PDCP entity or a MAC entity such as those described herein).

In an embodiment, probing-based rate control may be used. The rate control function may probe for available resources over the WiFi interface, which may be useful, for example, in cases where transmissions over WiFi are expected to be contention-based. An additive increase and multiplicative decrease may be used if probing WiFi capacity.

The WTRU may implement some form of TCP-like additive "increase multiplicative decrease" behavior to "probe" WiFi. In other words, the WTRU may gradually increase the amount of data routed to the second interface (e.g., based on metrics such as those described herein).

Possibly, the WTRU may apply such transmission rate on the rate of filling for the bucket of the WiFi interface as part of the MAC LCP procedure. Possibly, such as an increase would contribute in reducing the applicable LTE rate and vice-versa.

Possibly, the WTRU may apply such transmission rate on the buffer management when splitting data available for transmission using LTE and data available for transmission using WiFi.

For example, the WTRU may use such rate control mechanism to ensure that the LTE interface may be used to compensate for any variation in available transfer rate for the WiFi interface.

The WTRU may be configured with a rate control function to control the amount of data to be transmitted using the WiFi interface. The rate control function may use a transmission window. The rate control function may be configured with an initial value for the window (e.g., an initial rate). Such rate control function may increase or decrease the transmission window depending on different events.

For example, the WTRU may decrease the transmission rate associated with the WiFi interface (e.g., it may decrease the size of the transmission window) when it determines at least one of the following factors.

One factor may be that the WiFi interface does not perform on par with the rate (e.g., a buffer drop due to congestion). An example may be where a metric such as one described above no longer meets a specific condition. For example, one or more data units pending for transmission using the WiFi interface may have exceeded their maximum time of stay in the buffers (e.g., the buffers related to the WiFi interface).

Another factor may be that the WTRU determines that one or more data units have not been successfully transmitted using the WiFi interface. For example, a data unit may be discarded due to excessive latency, or one or more transmissions may be reported as unsuccessful by the WiFi interface. For example, the WTRU may determine that the transmission of a data unit was unsuccessful from the reception of a status report (e.g., such as those described herein). The amount of data units may be a configurable aspect and may be applicable per given, possibly configurable, period.

Another factor may be the occurrence of one or more impairment events, such as a change in available WiFi rate.

The amount of rate decrease (or window size adjustment) may be a configurable aspect. For example, the WTRU may decrease the transmission rate by a certain amount in terms of bitrate or in terms of packet rate. Similarly, the WTRU may decrease the size of the window by a certain amount of bits or by a certain amount of data units (e.g., PDCP SDUs, IP packets, or PDCP PDUs). This may depend on whether the rate is expressed in terms of bitrate or rate of data unit transmission. For example, the amount of decrease may be a multiplicative factor applied to the current transmission rate (e.g., such as halving the transmission rate) for a multiplicative decrease. The factor may be a fraction or an integer value and may be a configurable aspect.

The WTRU may perform additional actions when it determines that the transmission rate should be decreased for the WiFi interface, such as initiate the reporting and/or perform the recovery actions as described herein.

The WTRU may increase the transmission rate associated with the WiFi interface (e.g., it may increase the size of the transmission window) when it determines at least one of the following factors.

One factor may be when data is successfully transmitted using WiFi. The WTRU may determine that one or more data units have been successfully transmitted using the WiFi interface. For example, the transmission of a data unit may be reported as successful by the WiFi interface. The WTRU may determine that the transmission of a data unit was successful from the reception of a status report (e.g., such as those described herein). The amount of data units may be a configurable aspect and may be applicable per given, possibly configurable, period.

Another factor may be when the available WiFi rate changes to a higher rate.

The amount of rate increase (or window size adjustment) may be a configurable aspect. For example, the WTRU may increase the transmission rate by a certain amount in terms of bitrate or in terms of packet rate. Similarly, the WTRU may increase the size of the window by a certain amount of bits or by a certain amount of data units (e.g., PDCP SDUs, IP packets, or PDCP PDUs). This may depend on whether the rate is expressed in terms of bitrate or rate of data unit transmission. For example, the amount of increase may be a multiplicative factor of the amount of successful data transmitted for a given period. The window size may be increased by an amount equivalent to the amount of data successfully transmitted during a given period (i.e., an additive increase). In an embodiment, the amount of increase may be a multiplicative factor of the current transmission rate (i.e., a multiplicative increase). The factor may be a fraction or an integer value and may be a configurable aspect.

The determined rate may be used to determine how much data to make available to the WiFi interface. The WTRU may make data available for transmission using the WiFi interface for the applicable bearers up to the current transmission rate, which may be determined from the size of the transmission window. For example, the rate control configuration may be per bearer, group of bearers, or for all data units. In an embodiment, the rate control configuration may, only be for bearers of a certain type (e.g., split bearers, DRBs, and/or bearers carrying user plane traffic only).

The determined rate may modify the PBR for the WiFi interface, and possibly, the LTE interface. For example, the transmission rate may impact the bucket size as part of the Prioritized Bit Rate (PBR) for a split bearer when the WiFi interface is active. The WTRU may determine the PBR part to be used for the LTE interface as the difference between the PBR value configured for the bearer and the transmission rate for the concerned bearer. Alternatively, the PBR value may be set to a different value for the different branch of the split bearer. In this case, the WTRU may evaluate the amount of data to make available to the WiFi interface for the split bearer before evaluating the amount of data to transmit using WiFi based on the determined transmission rate.

The determined rate may be used to split data available for transmission for each interface. In this case, the routing of uplink traffic may be performed as part of the logical channel prioritization (LCP) function inside the MAC entity, or as part of a "Logical Interface Prioritization" function (e.g., inside a PDCP entity or a MAC entity such as described herein), wherein the transmission rate may be first applied.

In an embodiment, the WTRU may determine how to adjust the rate once per period. The period may be a configured aspect of the WTRU. In an embodiment, the period may correspond to an interval between the reception of status information from the base station, as described herein. The status information may include an amount of data successfully received for the concerned period. The status information may include an amount of missing PDUs/SDUs for the concerned period. The status information may be a PDCP SR.

In an embodiment, the period may be an estimation of the RTT. The RTT may correspond to the RTT of the WiFi interface for any type of bearer. The RTT may correspond to the RTT of the combined LTE and WiFi interface (e.g., the slower of the two) for a split bearer.

In an embodiment, quality-based rate control may be used. Similar to the previous embodiment, the WTRU may determine a transmission rate for the first interface by gradually offloading data to the second interface. In such case, the transmission rate is associated to the interface that seeks to offload data.

The WTRU may thus initially start with a transmission rate for the first interface, which may be infinity when the offload has not yet started. The first interface may be the one offering suitable QoS guarantees (e.g., LTE). The WTRU may start transmission using a second interface (e.g., WiFi) by starting an offload from the first interface to the second interface. The WTRU may gradually decrease the transmission rate on the first interface by routing data to the second interface.

The WTRU may perform the offload as long as one or more conditions related to selected metrics are met. For example, triggers to increase the transmission rate using LTE may be based on metrics indicating insufficient QoS for the WiFi interface. For example, the WTRU may use the rate control mechanism to ensure that the LTE interface may be used to compensate for any variation in available transfer rate for the WiFi interface.

In an embodiment, token-based rate control may be used. In this embodiment, various methods based on token accumulation and priority between interfaces may be used. In one example embodiment, the WTRU may maintain a token bucket, tokenBucket, that may be used to indicate an amount of data that may be transmitted using a given interface for the concerned bucket duration. The WTRU may increase (or fill) a bucket according to a possibly configured rate (e.g., a bucketFillRate).

Optionally, in this case, the WTRU may additionally be configured with one or more dedicated resources for one of the plurality of available interfaces during the concerned Prioritization Time Interval (PTI).

In one example, a common bucket may be used for all applicable bearers. The WTRU may be configured for operation using LTE as a first interface and for operation using WiFi as a second interface. The WTRU may be configured with a first bucket value for the LTE interface applicable to one, a subset or to all bearers whose data may use any of the two available interfaces and similarly with a second bucket value for the WiFi interface.

This configuration may be realized using a priority level (e.g., high or low), a target bit rate (TBR), and a bucket size duration (BSD) associated to each interface. For example, the LTE interface may have: priority=LOW (0), TBR=Infinity and BSD=PIT. In this case, the bucket size for LTE may be set to infinity such that the LTE interface may be used to carry excess data that WiFi is not expected to serve. The WiFi interface may have: priority=HIGH (1), TBR=finite (non-zero) value, and BSD=PIT. In this case, the bucket size may be non-zero and may have a finite value corresponding to an amount of data that is expected to be served by the WiFi interface for each PIT. The WiFi interface may be expected to carry data up to a certain amount and/or up to a certain rate.

In an embodiment, the bucket size (or the target bit rate) associated with the WiFi interface may correspond to resources allocated to the WTRU. The resources may be allocated in a semi-static manner and/or in a contention-free manner. The allocation may be configured using L3/RRC signaling or assigned by the WLAN AP to the WTRU. The above may be applicable when data from one or more bearers of the WTRU's configuration may be routed to one of the two available interfaces. The function may be used to determine what interface will consider that it has new data available for transmission when new data (e.g., IP packets) arrives in the WTRU's buffers (e.g., in PDCP or above).

In another example, there may be a separate bucket for each applicable bearer. Groups of one or more bearers may be configured such that different bucket value and different priority may be applied. For example, this may be configured per LCG.

In an embodiment, parameterized queue management, such as Active Queue Management (AQM) may be used to control the split between the WiFi and the LTE interface. Instead of dropping a packet from the buffer to affect the sender's rate as with normal AQM, the WTRU may reassign one or more data units from one interface to the other interface. This may be done when the WTRU determines that congestion is occurring, or that one or more metrics do not meet a required condition (e.g., in PDCP or elsewhere). In an embodiment, this scenario may be implemented under network control.

AQM may be used to control the size of the queues and corresponding queuing delays. When used with TCP, AQM may achieve this by actively dropping packets and forcing higher layer protocols, such as TCP, to reduce their send rate. When TCP reduces its send rate, the queue sizes and queuing delays may be reduced. AQM may be a sender-side function, where the decision to drop packets can be based on a threshold (e.g., the size of a queue or the age of the queued packets).

Similar principles may be used when splitting data traffic between a plurality of interfaces. A function similar to AQM may be used to start routing packets to a second interface based on an evaluation of one or more metrics, such as those described herein. For example, this may include a threshold, such as the size of "outstanding data" associated to the first interface or the age of the oldest unacknowledged data associated to the first interface.

For example, the WTRU may determine that congestion is occurring, or that one or more metrics does not meet a required condition, for the WiFi interface. The WTRU may then assign any new data (e.g., associated with a split bearer) that arrives in the WTRU's buffer (e.g., PDCP) for transmission to the LTE interface until it determines that the WiFi interface is no longer experiencing congestion, or that the one or more metrics are now meeting a required condition. In an embodiment, the WTRU may initiate retransmission of one or more data units already assigned to the WiFi interface using the LTE interface. In an embodiment, the WTRU may reassign one or more data units from the WiFi interface to the LTE interface.

In an embodiment, the available WiFi rate may be used for rate adjustment. This would be possible in the white box approach described above, wherein information can be extracted from the WiFi interface and is available to the LTE interface. The WTRU may determine a target rate to apply to control the amount of data to be transmitted using the WiFi interface based on indications received from the WiFi component. The indication may be based on metrics described herein, including the available transmission rate for the WiFi interface. The WTRU may then make data available for transmission using the WiFi interface for the applicable bearers up to the target rate.

In an embodiment, Logical Interface Prioritization (LIP) may be used for rate adjustment. A new data distribution function may be used to route uplink data between a plurality of interfaces. In one embodiment, the WTRU may be configured with a LIP. The LIP may be configured to operate using a rate control function, such as those described herein. The WTRU may perform LIP for new data that arrives for uplink transmission and that may be transmitted using any one of a plurality of interfaces, such as data associated to a split bearer.

For example, the WTRU may perform LIP above or inside PDCP for the bearer. The PDCP entity may maintain separate queues, one for each available interface. The WTRU may fill such queues using the configured rate control function. The WTRU may use the LIP function to perform uplink routing of data units. Once the WTRU determines the applicable interface for a data unit, the WTRU may then consider the data unit available for transmission. This may be done for the purpose of buffer status reporting (if applicable) and/or for the purpose of LCP for the LTE interface (if applicable). This may also be done for the purpose of maintaining applicable metrics.

The WTRU may determine how to route data in the uplink direction using a prioritization function. The prioritization function may be applied over a given period of time. The prioritization may be used to determine the identity of the interface to use for the transmission of at least a subset of the data. The data may consist of any type of data (e.g., control plane data and/or user plane data). In an embodiment, the data may consist of only user plane data. The user plane data may consist of data associated to a PDCP layer (e.g., PDCP PDUs or enhanced versions thereof). The user plane data may be associated to a bearer that may be associated to a plurality of interfaces.

For example, the selection of an interface for the transmission of data may vary over time for a given bearer (e.g., EPS bearer). The time may be an evaluation period. The time may be further referred to as Prioritization Time Interval (PTI). The time may correspond to at least one LTE Transmission Time Interval (TTI). In an embodiment, the time may correspond to an integer multiple of LTE TTIs.

The following embodiments may address retransmissions for offloaded data. More specifically, the following may address how the WTRU detects failure to transmit offloaded data, and, if needed, how to perform a retransmission for the concerned data. The WTRU may determine that one or more data units assigned for transmission using the WiFi interface are to be retransmitted according to one or more of the following parameters.

Retransmission may be performed when the WiFi component may indicate that a data unit was not successfully transmitted. Retransmission may be performed when the WiFi component may indicate that an event that impairs transmission is occurring (e.g., the interface is in a state associated with an insufficient transmission rate, such as a zero rate).

Retransmission may be performed when the WTRU may determine that a data unit was not successfully transmitted using the WiFi interface. This may be based on the reception of status information (e.g., PDCP SR), or a lack of confirmation from the WiFi interface within a given time for a given data unit.

Retransmission may be performed when the WTRU may determine that the available transmission rate for the WiFi interface is insufficient (e.g., zero).

Retransmission may be performed when a condition associated to one or more metrics as described herein is not met for one or more data units.

Retransmission may be performed when a SDU Discard Timer is associated with the concerned data units, and the timer has not elapsed and is still running.

Retransmission may be performed when a SDU retransmission timer is associated with the concerned data units, and the timer has elapsed and is not running. For example, the SDU retransmission timer may be set to a value smaller than the SDU Discard Timer.

Retransmission may be performed when the WTRU initiates a reconfiguration of the WiFi interface that changes the applicable AP (e.g., AP mobility).

Retransmission may be performed when the WTRU initiates a reconfiguration of one or more bearers at least in part associated with the WiFi interface at least in the uplink direction that removes (e.g., from split to LTE-only) or modifies (e.g., from WiFi-only to LTE-only, or for AP mobility) the association with the WiFi interface.

When the WTRU determines that a retransmission is performed due to a reconfiguration and/or a mobility event, the WTRU may initiate cumulative retransmissions starting from the first unacknowledged data unit for the applicable bearers. In an embodiment, the WTRU may perform selective retransmissions using information received in a status report (e.g., PDCP SR) and/or based on indications from the WiFi interface (e.g., local NACKs). In an embodiment, the WTRU may perform retransmissions only for data units for which the WTRU has not previously attempted to transmit using the LTE branch associated with the bearer (if applicable).

Retransmissions may be performed over the WiFi interface. The WTRU may determine that the retransmission of the one or more data units may be performed using the WiFi interface. In an embodiment, this may be done only if the transmission using the WiFi interface can meet the condition associated to the one or more metrics for the concerned data units. The metric may be based on latency aspects. The WTRU may determine that the retransmission may meet the required delay budget for the concerned bearer. This may be based on the time spent in the WTRU's buffer, the configuration of the SDU retransmission timer for such bearer, and/or the remaining value of a SDU retransmission timer. The metric may be based on the availability of the WiFi interface. If the loss may be caused by insufficient available data rate for the WiFi interface, the WTRU may refrain from performing the transmission using the WiFi interface.

The retransmission may be done using a different interface (e.g., LTE). The WTRU may determine that the retransmission of the one or more data units may be performed using the LTE interface. In an embodiment, this may only be done if the transmission using the LTE interface can meet the condition associated to the one or more metric for the concerned data units. For example, the WTRU may be configured with a SDU Retransmission Timer. The timer may be configured for a given bearer, and the time may be configured for a given interface.

The determination may be performed in the PDCP entity for the applicable bearers. The bearer may be a split bearer, or a WiFi-only bearer (e.g., for initial transmission) configured such that only retransmissions may use LTE.

Legacy protocols may be modified or enhanced to support operation with an LTE interface and a WiFi interface. One or more of the following functions may be enhanced to support operation with a LTE interface and a WiFi interface.

One function that may be enhanced is buffer management. This may be done via PDCP-based control. For example, the WTRU may implement a rate control function within (or close to) the PDCP layer such that the WTRU may determine a certain amount of data to be offloaded to the WiFi interface. Such control function may be a LIP function and/or a rate control function such as those described herein.

The PDCP-based control of the data offload towards the WiFi interface may be introduced (e.g., for uplink split bearers) when primitive-based operation may be possible with the WiFi interface. For example, PDCP may be augmented with a rate control function (e.g., for split bearers) to implement management of the data becoming available for transmission and/or to split the applicable traffic towards the available interfaces.

Another function that may be enhanced is scheduling control. This may be done via MAC-based control. For example, the WTRU may implement the rate control function within (or close to) the MAC layer. In this case, the rate control function may be based on scheduling aspects. The control function may be combined with the existing LCP procedure, for example, by supporting a rate control function. MAC-based control of the data offload towards the WiFi interface may be introduced (e.g., for uplink split bearers) when policing-based operation is used.

It should be noted that a function may be split across more than one protocol layer.

The following embodiments may address uplink (or downlink) scheduling information.

From the network perspective, the base station may control the offload to WiFi using control signaling. In an embodiment, the base station may determine how to route traffic in the uplink and/or in the downlink based on uplink scheduling information received from the WTRU. In an embodiment, the base station may determine how to route traffic in the uplink and/or in the downlink based on other control signaling received from the WTRU, such as measurements (including WiFi-related quantities), reporting of metrics, and/or feedback received from the WTRU using uplink LTE (e.g., CQI reports). The WTRU may transmit the CQI report by considering the WiFi interface as a SCell of the WTRU's configuration, where different codepoints may indicate one or more metrics.

The WTRU may receive any of the information and signaling described herein for the purpose of rate control and offload control using other embodiments described herein. For example, the WTRU may receive downlink scheduling information such as a transmission status report for uplink data transmitted using the WiFi interface. The information may report the amount of data successfully transmitted using WiFi and may be used for the purpose of rate control using the embodiments described herein. The information may be carried as a MAC CE or using a PDCP SR. The WTRU may transmit similar information in the uplink for information related to downlink reception.

An embodiment may include Channel Quality Indication (CQI) Overload for WiFi (WiFi-CQI). In legacy LTE systems, the WTRU may report a CQI value for a given serving cell. The CQI value may be reported periodically (e.g., based on L3/RRC configuration) or triggered by reception of downlink control signaling (i.e., aperiodic CQI).

In one embodiment, the WTRU may report a CQI value for the WiFi interface (WiFi-CQI) using an uplink transmission similar to the legacy procedure. The uplink transmission may be performed using LTE uplink resources (e.g., using PUCCH or PUSCH according to legacy procedures). For example, the WTRU may be configured for WiFi-CQI reporting, such that the WiFi interface is associated with a serving cell identity. The WiFi-CQI reporting may include a periodic trigger for including a value in the CQI report. The WiFi-CQI reporting may include a configuration for an aperiodic reporting. The value in a WiFi-CQI report may correspond to one or more aspects of the WiFi interface. The aspects may include one or more of the metrics described herein. A separate set of codepoints may be defined for WiFi-CQI to enable the reporting of such aspect.

The WTRU may periodically generate a WiFi-CQI value to report the actual available WiFi transmission rate to the base station. In an embodiment, the WTRU may generate a WiFi-CQI value using legacy aperiodic triggers, for example, when an identity corresponding to the WiFi interface is received in the concerned control signaling. Possibly, one Wi-Fi-CQI value may include "0" or "OOR" (out-of-range).

Embodiments may include Buffer Status Reporting (BSR). In one embodiment, the WTRU may exclude from the BSR calculation an amount of data associated to one or more bearers (or corresponding Logical Channels) offloaded to WiFi from the BSR reporting. For example, the WTRU may not count the data of such a bearer when reporting BSR if it determines that all of the associated traffic is subject to transmission over WiFi. When UL data becomes available in the PDCP (or in the RLC entity, if applicable) of a bearer that has been selected and/or configured to be offloaded to WiFi, it may not trigger a regular BSR.

In an embodiment, the WTRU may be configured such that all the offloaded bearers are associated to the same LCG when one or more bearers are selected for WiFi offloading. Alternatively, the WTRU may be configured such that when at least one bearer selected for WiFi offloading is associated to a given LCG, the LCG may only be associated with bearers selected for WiFi offloading. Such may make it simpler for a WTRU implementation to exclude the offloaded bearer from the BSR reporting, especially when LCG priority needs to be decided when sending a BSR.

In an embodiment, the base station may reconfigure the Logical Channel Groups so that all the offloaded bearers are configured in the same LCG. The base station may then simply ignore the buffer status of that particular LCG. With this embodiment, the WTRU procedure of BSR reporting may remain unchanged and may consider those offloaded bearers the same as those remaining on LTE-Uu interface.

In an embodiment, the traffic (or corresponding PDUs) of a bearer that is to be transmitted using resources of the LTE-Uu interface may be put in a separate PDCP (or RLC buffer, if applicable). The WTRU may then only count the data in that buffer for buffer status report if some application flows of a bearer are to be offloaded to WiFi access while other application flows of the bearer are to remain on LTE-Uu.

In an embodiment, the base station may reconfigure those offloaded bearers (either partially or wholly) into the same Logical Channel Group. Then when it receives the buffer status of that particular group, it may take a percentage of the reported amount as the real buffer status for that LCG. How to choose the appropriate percentage may be a base station implementation choice.

Embodiments may include new BSR triggers for LTE when the WTRU is configured with a WiFi interface. The WTRU may trigger the transmission of a BSR according to at least one of the following parameters.

The WTRU may trigger the transmission of a BSR when the amount of data considered for transmission using the LTE interface changes due to events occurring in the WiFi interface. The change may include variations in offload rate. For example, for split bearers for which data may be considered as available for transmission to either or both the LTE and the WiFi interfaces, the WTRU may trigger a BSR if the amount of data available for transmission either increases (e.g., WiFi is not offloading at the expected rate) or decreases (e.g., WiFi is offloading data at a higher rate than expected) by a certain (possibly configurable) amount of data. For example, the WTRU may trigger a BSR report when the available transmission rate for the WiFi interface drops to zero.

The change may also include variations in offload availability. For example, the WTRU may trigger a BSR when a state of the WiFi interface changes. The state may be an activation state, in which case a BSR may be triggered upon configuration and/or activation of a WiFi interface with at least one applicable bearer. In this case, the BSR may report an updated amount of data available for transmission using the LTE interface by considering a certain amount of data may be offloaded using the WiFi interface. Such state may be a deactivation state, in which case a BSR may be triggered upon removal and/or deactivation of a WiFi interface that had at least one applicable bearer. In this case, the BSR may report an updated amount of data available for transmission using the LTE interface by considering a certain amount of data may no longer be offloaded using the WiFi interface. The state may be a transitory state such as the time during which a mobility event occurs. The mobility event may be a change of AP for the WiFi interface. For example, the WTRU may trigger a BSR when it reconfigures the WiFi interface.

The change may also include variations in offload rate if data available for transmission increases. The WTRU may consider data as new data available for transmission in the PDCP layer according to the above. For example, the WTRU may consider data as new data available for transmission when such data is reassociated from a split bearer or from a WiFi-only bearer back to a LTE-only bearer. For example, the WTRU may consider data as new data available for transmission when a portion of data associated to a split bearer is no longer properly served using the offload interface (e.g., the WiFi interface).

The WTRU may trigger the transmission of a BSR when there is a change in the buffer fill rate. The WTRU may trigger a BSR when it determines that the rate at which the buffer occupancy for a given DRB configured for offload and for uplink split is being drained by the WiFi interface above a certain (possibly configurable) threshold. This may be done for the PDCP buffer only. For example, the WTRU may determine that the amount of, for example, PDCP, data transmitted using resources of the second interface exceeds the amount of new data available for transmission by a given value during a given period since the last time the WTRU reported BSR. This relates to scenario where a PDCP buffer is emptying much faster than expected, as a result from transmissions performed in the offload interface, for example.

The WTRU may trigger the transmission of a BSR when there is a change in buffer occupancy. The WTRU may trigger a BSR when it determines that the amount of data in the WTRU's buffer for a given DRB configured for offload and for uplink split has dropped by an (possibly configurable) amount of data. This may be done for the PDCP buffer only. The amount may be a ratio or a percentage of the buffered data. The amount may correspond to data transmitted using the WiFi interface only, possibly since the WTRU last transmitted BSR information for the concerned LCH and/or LCG. For example, the WTRU may trigger BSR when it determines that the amount of data available for transmission has dropped by an amount equivalent to a percentage larger than X % (where X is typically larger than 100) of the amount of corresponding data transmitted for the concerned DRB since the last transmission of a BSR that included a value for such LCH (or LCG).

The WTRU may trigger the transmission of a BSR based on the exaction rate of the buffer. For example, the WTRU may trigger a BSR when it determines that the transmission rate of data in the WTRU's buffer or a given DRB configured for offload and for UL split has changed by an amount that is a (possibly configurable) value X since the last transmission of a BSR that included a value for the PDCP buffer only. The amount may correspond to data transmitted using the WiFi interface only, possibly since the WTRU last transmitted BSR information for the concerned LCH and/or LCG.

The WTRU may trigger the transmission of a BSR based on the transmission delay of buffered data. For example, the WTRU may trigger a BSR based on an increase in average transmission delay for PDCP SDUs. The WTRU may trigger a BSR when reaching a certain amount of delay for the head-of-queue (i.e., the oldest PDCP SDU in the WTRU's buffer). The WTRU may trigger a BSR when the gap between the rate at which the WTRU's buffer is drained by the WiFi interface and the fill rate for such buffer increases beyond a certain value. This may be done for the PDCP buffer only. Additional triggers may also be introduced for the converse events.

The WTRU may trigger the transmission of a BSR based on retransmissions using a different interface. For example, the WTRU may be configured to perform one or more retransmissions of a data unit (e.g., a PDCP SDU or PDU) using the LTE interface following the failure by the WiFi interface to perform the transmission of the concerned data unit. In such case, the BSR may additionally trigger a SR.

The WTRU may trigger the transmission of a BSR based on a mobility event. For example, if the WTRU is configured to route uplink data using the LTE interface during a mobility event for the WiFi interface, the WTRU may trigger a BSR. The timing of the BSR may be one of the following: the reception of the RRC reconfiguration request that initiates such mobility event, the initiation of the dissociation of the WiFi interface from the source AP, or an indication that the available transmission rate of the WiFi interface is zero.

The above triggers may be applicable per bearer, per LCH and/or per LCG. In an embodiment, the BSR trigger may not lead to a SR trigger. In an embodiment, the trigger may be for the concerned aspect as aggregated for the WiFi interface. In an embodiment, the BSR may additionally include an indication for the WiFi interface according to one or more metrics such as those described herein.

Embodiments described herein may include WiFi status reporting (WSR) or Happy Bits. In one embodiment, the WTRU may report information related buffer status, similar to the above, or information derived from the operation of the WiFi interface based on, for example, metrics described herein. The WTRU may be configured to report metrics. The metrics may be derived for one or more aspects related to the WiFi interface. The report may be included in a MAC PDU sent over the LTE interface. The report may be included only when the concerned interface (e.g., WiFi) is active and/or has at least one configured bearer associated with it.

The report may be signaled as MAC CBSR CE. For example, the WTRU may include the report in some (or all) PDUs transmitted using the LTE interface. The report may be signaled as a separate MAC Control Element (MAC CE). The report may be signaled as Happy Bits. For example, the WTRU may include the report in some (or all) PDUs transmitted using the LTE interface. The report may be signaled by re-using reserved (or unused) bits inside the MAC subheader (e.g., "R" bits, or equivalent), or by adding a new field in the MAC PDU format.

The WTRU may report an estimation of the available data rate for the WiFi interface, or other similar indication of the quality of the WiFi link. In particular, one codepoint may be reserved for a state where the WiFi is "disabled" and/or the available rate is "zero". Other states that may be reported include "in-range but not associated", "associated", "active" or "inactive."

The WTRU may report an estimation of the buffer fill rate and/or buffer depletion rate. The reporting may be for a single bearer, for a group of bearers, and/or for all data associated with the WiFi interface.

The WTRU may report an indication of whether or not the QoS guarantees are being met for data associated with the WiFi interface. The reporting may be for a single bearer, for a group of bearer, and/or for all data, associated with the WiFi interface.

The WTRU may report the amount of data that it is associated to the WiFi interface (e.g., information about data in the associated buffer and/or an estimation thereof). The reporting may be for a single bearer, for a group of bearers, and/or for all data associated to the WiFi interface. The signaling may provide information on the aggregated buffer occupancy for one or more DRBs configured for UL split and/or associated with WiFi only.

The dynamic signaling may be referred to as Happy Bits. In an embodiment, the happy bits are applicable only when at least one bearer is configured with UL split and associated to the WiFi interface. The happy bits may signal information related to a single Logical Channel Group (LCG) and/or bearer, or to the aggregation of a plurality, of LCGs and/or bearers configured with UL split, when such group of bearers only include bearers configured for transmission over the WiFi interface. The use of happy bits may also be a configuration aspect.

The WTRU MAC entity may include happy bits using a single bit. When a single bit is used, the WTRU may signal whether the amount of data (e.g., PDCP PDUs) in the buffers associated with the WiFi interface is increasing or decreasing. For example, the WTRU may set the bit if the amount of data in the concerned buffers has increased by a possibly configurable amount X since last transmission of a BSR (if the BSR includes reporting of data associated with the WiFi interface) that reported a value for the concerned bearers. Alternatively, if the BSR does not report data associated with the WiFi interface, the WTRU may set the bit simply if the amount of data in the concerned buffers is larger than a possibly configurable amount X.

If a format is used whereby a single bit is used per MAC PDU, the signaling may reflect the total amount of data in the WTRU's buffer for all DRBs configured with UL split and associated to the WiFi interface. Alternatively, the WTRU may set the bit such that it indicates that the WTRU requests uplink resources to compensate for an insufficient transmission rate over the WiFi interface for the concerned bearers.

The WTRU MAC entity may include happy bits using a two-bit field. When more than one bit is used, the WTRU may use codepoints such as according to at least one of the following parameters.

Values 00, 01, 10, 11 may indicate relative buffer levels for the applicable bearers. The values may be absolute values. Alternatively, the values may be in relation to the size of the transport block in which it is sent over the LTE interface. The values may include "empty buffer" ("00"), larger than or "infinite" ("11"), with "01" and "10" as intermediate levels.

Values 00, 01, 10, 11 may indicate an approximate transmission rate for the concerned bearers as observed according to embodiments described herein or as extracted from the WiFi interface. The values may be absolute values. Alternatively, such values may be in relation to the size of the transport block in which it is sent over the LTE interface. Alternatively, the values may be in relation to the configuration of a possibly aggregated target rate for the concerned bearers.

In an embodiment, the WTRU MAC entity may include happy bits, such that the WTRU may signal average time-of-stay, head of queue delay, whether the buffer (e.g., PDCP) levels tend to increase or decrease, and/or the difference between the buffer (e.g., PDCP) fill rate and what's drained by the WiFi interface for data associated with the WiFi interface. It should be noted that similar signaling as described in the previous embodiments may be used.

In an embodiment, the WTRU MAC entity may include happy bits such that the WTRU signals a QoS Status Reporting (QSR). This may include reporting of WiFi metrics in a more dedicated fashion. The WTRU may be configured to report a number of parameters related to QoS, which may be derived using any of the metrics described herein.

The WTRU may determine the indication on a per subframe basis, once per scheduling period, or after the QoS property is not met for a (possibly configurable) period. In an embodiment, this period may be starting from the subframe in which a corresponding QSR is triggered, or transmitted. Similarly, the WTRU may stop using the WiFi interface when it determines that the corresponding QoS requirement is not being met.

From the network perspective, the QSR reporting may be useful for a LTE scheduler. The scheduler may determine the impact (e.g., how well QoS is served) of the WiFi interface using the reporting and may compensate with appropriate scheduling for the LTE interface.

For example, the base station may receive a QSR from a WTRU which may indicate that QoS is not met for at least one bearer of the WTRU's configuration. If the bearer is associated to the WiFi interface only, the base station may perform one or more of the following actions. The base station may implement some form of active queue management, such that the data rate of the application is reduced in the WTRU. This may be done, for example, by using Explicit Congestion Notification (ECN) marking or by selectively dropping packets. The base station may configure and/or trigger mobility-related measurements for the WiFi interface. The base station may initiate mobility for the bearer, such that the bearer is moved to the LTE interface. The base station may reconfigure the bearer, such that downlink split and/or uplink split is supported. The base station may notify the MME/NAS, such that the service may be reconfigured.

If the bearer is configured such that bearer split is supported, in addition to any of the actions above, it may allocate more resources for the concerned bearer for the LTE interface.

The QSR may contain one or more of the following QoS-related information.

The QSR may contain a timing related value, such as a head of queue delay (QSR/Delay). The QSR may include a value related to the time that data has spent in the WTRU's buffer. The value may be calculated from the time the data was first made available for transmission (arrival time) until the time when the report is triggered, the time when the corresponding data (e.g., PDCP PDU) is assigned to the WiFi interface, or the time when the corresponding data (e.g., PDCP PDU) is first transmitted using the WiFi interface.

For example, the value may correspond to the maximum delay that may elapse before data in the WTRU's buffers (e.g., a SDU or a PDU) should be transmitted, for the data in which such delay is shortest. For example, this may correspond to a value associated to a PDCP discard timer. For a given bearer, the WTRU may determine a value equal to the difference between discard timer and arrival time/current time.

Alternatively, the WTRU may report the time of stay in the WTRU's buffer for the oldest data for the concerned bearer.

For any of the embodiments above, the data may be data associated with the bearers, independently of whether the bearer is associated only to WiFi or not (e.g., a split bearer). For split bearers, the QSR may report the compounded effects of transmissions over both interfaces. In an embodiment, the data may be data only for transmission over the WiFi interface. In this case, the QSR may report only the impact of the WiFi interface on the QoS of the bearer.

The QSR may contain a transfer rate related value, such as a rate satisfaction for UL or an observed rate for DL. The QSR may include an indication of whether or not a transmission rate (e.g., a Prioritized Bit Rate) is met for at least one of the items for which a QSR may be applicable.

The report may include an indication of rate dissatisfaction. For example, the report may include only an indication that the applicable rate for at least one item (e.g., one or more bearers) has not been met. In an embodiment, the WTRU may determine whether or not rate dissatisfaction should be reported when the rate has not been met for a specific, possibly configurable, period of time.

The report may include an indication of how much additional data is required to meet the concerned rate. The report may include a value that corresponds to the minimum amount of data that would need to be transmitted for a given item, such that the WTRU may meet the corresponding rate. This may be done, in particular, when the item is a bearer or a group thereof. The WTRU may include in the report the identity of the item (e.g., a LCH or a LCG) for which the amount of data is the largest. When multiple items are included in the same report, each reported item may be in decreasing order of value reported, or as an ordered list of the concerned identities. In an embodiment, the WTRU may determine whether or not a value should be reported when the rate has not been met for a specific, possibly configurable, period of time.

In an embodiment, the period of time for which the WTRU may perform the evaluation of whether QoS requirements are met or not may be a function of a scheduling period. This may be done, for example, if the WTRU is configured such that the LTE interface and the WiFi interface operate using different period of time.

In addition, the QSR may contain any of the metrics described above.

The following may address QSR applicability and what radio bearers may be reported. The contents of the QSR may be applicable for one or more radio bearers of the WTRU's configuration, according to at least one of the following items.

The QSR may be WTRU-specific. It may include a report applicable to a plurality, or even all, of the bearers of the WTRU's configuration. The QSR may be layer-specific. It may include a report applicable to a plurality, or even all, of the bearers associated to a specific interface (e.g., the WiFi interface). The QSR may be group-specific. In an embodiment, the QSR may be only for radio bearers that are configured as part of a group (e.g., a LCG). In this case, the QSR may include one value for each group for which a report in included in the QSR. Alternatively, a separate grouping may be used.

The QSR may be priority-specific. In an embodiment, the QSR may be only for radio bearers associated to a specific priority, which may be equal or above a possibly configured threshold. The QSR may be for RBs with split operation. In an embodiment, the QSR may be only for radio bearers associated to (and/or configured for) uplink and/or uplink split operation (e.g., data from the radio bearer may be transmitted on the radio resources of both LTE and the WiFi interfaces). In an embodiment, the QSR may be only for the DRBs of the WTRU's configuration. For example, the QSR may not be applicable to a SRB.

The WTRU may report one value for each of a number of items of the above category, and may report up to a maximum number of items for each format of the concerned report. In an embodiment, a separate QSR may be defined for downlink traffic and another for uplink traffic.

The following may address QSR triggers. The WTRU may trigger the QSR according to at least one of the following criteria.

The WTRU may be configured to periodically trigger a QSR. For example, this may be done by receiving a configuration of a timer and by restarting such timer following each trigger of a QSR.

The WTRU may trigger a QSR when one or more QoS parameters is below a certain threshold, which may possibly be a configuration aspect of the WTRU as described above.

The WTRU may trigger a QSR/PBR when the rate for one or more items applicable to the reporting falls under a possibly configurable threshold. In an embodiment, this may be done when the parameter is below the threshold for a possibly configured amount of time. The WTRU may trigger a QSR/Delay report when the acceptable delay for one or more items applicable to the reporting falls under a possibly configurable threshold. For example, if, for a given radio bearer, the WTRU determines that the difference between discardtimer and arrival time/current time becomes less than such threshold, it may trigger a QSR.

The WTRU may trigger a QSR based on the WiFi radio link quality and/or the interface state. The WTRU may trigger a QSR when the WTRU determines that at least one aspect of the WiFi interface condition (e.g., radio link quality) is deteriorating below a possibly configurable threshold. This may occur, for example, when the WTRU initiates a procedure that may impair connectivity and/or transmission rate in the WiFi interface, such as one related to connectivity or mobility.

The WTRU may trigger a QSR based on an aperiodic request. The WTRU may trigger a QSR upon request from the network (e.g., upon reception of control signaling such as a MAC CE). The request may be received in L1 (e.g., as a flag in a DCI format) or in a MAC CE (e.g., as a flag in a MAC CE), possibly including explicit indication of what radio bearers the QSR should be sent for.

The WTRU may trigger a QSR based on WiFi deactivation. The WTRU may trigger a QSR upon reception of control signaling that deactivates the WiFi interface, or when the WiFi interface for any reason reaches an available transmission rate equal to zero. In an embodiment, this may be done only if there is still some data in the WTRU's buffer for the concerned interface. In an embodiment, this may be done only if the WTRU has data for a bearer associated only to the WiFi interface. This may assume that the report may be a trigger for radio bearer mobility. Alternatively, this may be done only if the WTRU has data for bearers associated with the WiFi interface when split transmission is supported for such bearers. This may assume that the report may be used to make scheduling adjustment upon change of available resources for a given WTRU.

The WTRU may trigger a QSR based on layer activation. The WTRU may trigger a QSR upon reception of control signaling that activates the WiFi interface (e.g., upon successful activation of the WiFi interface). In an embodiment, this may be done only if there is data in the WTRU's buffer for the concerned interface.

The WTRU may trigger a QSR when a normal BSR is triggered. For example, if the WTRU determines that the WiFi interface is no longer suitable for meeting QoS requirement of a split bearer (e.g., due to deactivation, deteriorating radio link quality, mobility, or any other impairment event), the WTRU may trigger a QSR, such that LTE interface may increase its scheduling activity by considering the impact of the deactivation event.

For example, if the WTRU determines that WiFi becomes available for improving the QoS requirement of a split bearer (e.g., due to activation, improving radio link quality; successful association, or any other event that enables more transmission resources), the WTRU may trigger a QSR, such that the network may adjust scheduling (and possibly also, configuration) based on the impact of the availability of the WiFi interface.

In addition, the WTRU may include a QSR report, possibly a short version, instead of padding, with lower priority than a padding BSR, if it fits in a transport block.

The QSR trigger may be subject to a prohibit mechanism, such as a timer. The prohibit mechanism may be applicable per reporting item as described above. When a QSR is triggered, the WTRU may start a timer and may be prohibited from triggering an additional QSR until the timer has expired.

The following embodiments may address QSR cancellation. When triggered, a QSR report may be pending until it is cancelled. A QSR report may be pending for a specific layer. A QSR report may be cancelled according to at least one of the following parameters.

The QSR report may be cancelled on an assembly of MAC PDU in the report. The WTRU may cancel a pending (and/or triggered) QSR when the corresponding report has included in a MAC PDU for transmission on a transport block.

The QSR report may be cancelled when a triggering condition is no longer met. The WTRU may cancel a pending (and/or triggered) QSR when the criterion that triggered the report is no longer met. For example, the WTRU may cancel a pending QSR/Delay report if the corresponding data is no longer in the WTRU's buffer. This may occur either because the data has been included in a transport block for transmission over LTE, because transmission of the data using WiFi has been confirmed, or because the data has been discarded. For example, the WTRU may cancel a pending QSR/PBR report if a sufficient amount of data from the corresponding reporting item has been included in transport block for transmission over LTE.

The QSR report may be cancelled upon a change of state for the WiFi interface. The WTRU may cancel all pending (and/or triggered) QSR when the WiFi interface is reset, reconfigured, deactivated, and/or removed from the WTRU's configuration. This may also occur upon bearer mobility that moves the bearers to the LTE interface.

The QSR report may be cancelled upon a change in configuration. The WTRU may cancel all pending (and/or triggered) QSR when the WTRU receives a reconfiguration of the concerned WiFi interface that modifies or removes the bearers that triggered the QSR. For example, this may occur upon reconfiguration of the applicable bearers.

It should be noted that when pending, a QSR may be transmitted, when a transport block that satisfies the requirement for the QSR transmission is met.

In an embodiment, the WTRU may evaluate the above cancellation criterion by including the impact of any feedback related to transmissions over the WiFi interface (e.g., for WiFi-only or split bearers), and/or including transmissions of transport blocks over LTE (e.g., for split bearers) up to and including those of the subframe in which the concerned report would have been transmitted if otherwise not cancelled by the evaluation.

The following embodiments may address QSR transmission, and which transport blocks may be used as well as what layer to report. A QSR may be reported using resources associated to the LTE interface. This may be similar to BSR transmission.

The following embodiments may address a scheduling request (SR). The WTRU may trigger a SR when it triggers a QSR. The WTRU may cancel a pending SR that was triggered by a QSR if the QSR for the concerned SR is cancelled. The WTRU may trigger a SR when it determines a change in state for the WiFi interface, especially when the change results in a lower available transmission rate using WiFi. In an embodiment, this may be done only if the rate becomes zero. The WTRU may trigger a SR when it determines that a condition associated to one or more metrics, such as those described above, are no longer met.

The following embodiments may address uplink status information, and for example, how to create a feedback loop using existing mechanisms. A downlink report may be used for rate control. The WTRU may receive any of the information and signaling described herein for the purpose of rate control and offload control using any of the embodiments described herein.

In an embodiment, additional information about the other interface may be reported/received in MAC or PDCP communications. For example, the WTRU may report additional information related to the operation of the WiFi interface.

The report may be a PDCP STATUS REPORT (PDCP SR). The report may include information about received PDCP PDUs. Preferably, the information may be for a specific bearer and may report the combined reception across all applicable interfaces for the concerned bearer.

The information may be for a specific interface (e.g., for PDUs received over the WiFi interface only). The PDCP PDUs may include interface-specific sequencing information. The information may be per interface, but a PDCP SR may include a report for each applicable interface for the concerned bearer.

For example, the WTRU may initiate the transmission of the PDCP STATUS REPORT (PDCP SR) according to at least one of the following parameters.

The PDCP SR may be reported periodically. The WTRU may be configured to initiate the transmission of a PDCP SR periodically. The period may correspond to a possibly configured amount of time or to a possibly configured amount of received PDCP PDUs. For example, the WTRU may initiate the transmission of a PDCP SR periodically using a period equal to that used for the rate control of the offload to the WiFi interface as described above. For example, the WTRU may initiate the transmission of a PDCP SR when it determines that the distance between the PDU with the higher sequence number received and the sequence number of the PDU for which it last reported SR is larger than a possibly configurable number of PDUs.

The PDCP SR may be reported upon a successful reception of a number of PDUs. For example, the WTRU may initiate the transmission of a PDCP SR when it successfully receives a number of consecutive PDUs. This trigger may be useful to a rate control function as described above. In particular, the transmission window may be advanced and/or the transmission rate may be adjusted timely by the sender.

The PDCP SR may be reported upon the detection of a number of missing PDUs. The WTRU may be configured to initiate the transmission of a PDCP SR when it determines from the reception of one or more PDCP PDUs with a sequence number higher than was reported in the last PDCP SR that there is a number of PDUs missing since the WTRU last reported SR. This trigger may be useful to a rate control function as described above. The transmission rate may be adjusted timely by the sender. For example, the trigger may be useful to enable the sender to perform retransmissions of missing PDUs, possibly using a different interface.

The PDCP SR may be reported based on polling or on an aperiodic request. The WTRU may receive a polling message that triggers a PDCP SR. The polling message may be a L1/PDCCH control signal (e.g., in a DCI and/or similar to the CQI aperiodic request) or a L2/MAC Control Element received in the downlink on PDSCH.

The PDCP SR may be reported based on buffer management. The WTRU may initiate the transmission of a PDCP SR when the size of the WTRU receive window reaches a certain threshold. This trigger may be useful to enable the sender to perform retransmissions of missing PDUs timely enough to avoid the case where a retransmission would fall outside of the receive window, be discarded by the receiver, and/or be delivered out-of-order. In particular, this may be useful for the case where the retransmission is made using a different interface.

The PDCP SR may be reported when the time-to-release exceeds a threshold. The WTRU may initiate the transmission of a PDCP SR when a certain time elapses since the oldest PDCP PDU/SDU in the receive window has been received. This trigger may have a similar benefit as the trigger based on buffer management. In particular, this trigger may be useful for management of a time-based receive window.

The PDCP SR may be reported when the oldest missing SN/SN gap size exceeds a threshold: The WTRU may initiate the transmission of a PDCP SR when the oldest missing PDCP PDU/SDU in the receive window hasn't been detected in more than a certain amount of time. The WTRU may initiate the transmission of a PDCP SR when the distance between the highest received PDCP PDU/SDU and the oldest missing PDU/SDU (or the oldest PDU/SDU in the window) exceeds a certain amount of data units.

The PDCP SR may be reported upon a reconfiguration event similar to a mobility event. In an embodiment, the WTRU may initiate the transmission of a PDCP SR when it receives a reconfiguration message that reconfigures and/or re-associates a WiFi-only bearer or a split bearer to the LTE interface. In an embodiment, the WTRU may initiate the transmission of a PDCP SR when it receives a reconfiguration message that reconfigures and/or re-associates a WiFi-only bearer to a split bearer. In an embodiment, the WTRU may initiate the transmission of a PDCP SR for a WiFi-only bearer and/or for a split bearer when it receives a reconfiguration message that reconfigures the WiFi interface such that a different WiFi AP is used.

The PDCP SR may be reported upon a reconfiguration event that removes a WiFi branch that is associated with a bearer. The WTRU may initiate the transmission of a PDCP SR when it receives a reconfiguration message that reconfigures a WiFi-only bearer or a split bearer such that the bearer is removed from the WTRU's configuration. In an embodiment, the WTRU may consider only PDUs received since the WTRU last reported PDCP status for the concerned bearer. In an embodiment, the WTRU may initiate the transmission of a PDCP SR only when it determines that at least the WiFi interface is activated for reception of data and/or configured/enabled for reception of data for the concerned bearer. In an embodiment, this may be done with both the LTE and the WiFi interfaces are.

The following embodiments may address in-order delivery and duplicate detection. In an embodiment, the WTRU may report additional information related to the operation of the WiFi interface, such as the reception of one or more duplicates.

The following embodiments may address logical channel prioritization (LCP). The LCP may exclude data and LCH may be offloaded to WiFi. In an embodiment, the WTRU may exclude an amount of data associated to one or more bearers, or corresponding Logical Channels, offloaded to WiFi from the Logical Channel Prioritization procedure. The WTRU may allocate resources for uplink transmissions to traffic, bearers, and/or to LCH associated with the LTE-Uu interface. Alternatively, the WTRU may receive a configuration for the Prioritized Bit Rate (PRB) of the offloaded bearers with a value of 0 to ensure that no LTE UL resource is given to them.

In another embodiment, the base station may also reconfigure the PRB of the partially offloaded bearer to a smaller value so the corresponding logical channel won't take more resources than necessary in the LCP procedure.

In an embodiment, protocol data units (PDUs) and/or service data units (SDUs) of a first radio interface (e.g., LTE) may be carried over a second radio interface (e.g., WiFi).

The following embodiments may include further enhancements to the LTE Packet Data Convergence Protocol (PDCP). In an embodiment a split bearer may be used. In an embodiment, LTE PDCP PDUs may be carried over a WiFi radio interface. The WTRU may be configured such that traffic associated to a bearer may use the services of a single PDCP entity. For this PDCP entity, the resulting PDUs may be transported using the services of the WiFi connection (e.g., a "SCG-only" bearer), or using the services of the LTE RLC and the services of the WiFi connection (e.g., radio bearer split).

The following may address the impact of the lack of RLC. When the protocol split occurs within or under the PDCP entity, additional functions may be required in the PDCP layer to compensate for the absence of the services provided by LTE RLC and/or to interact with the services provided by another radio interface of a different access type (e.g., WiFi). In this case, services typically provided by the LTE RLC to the LTE PDCP, such as an acknowledged data transfer service that may include notifications of successful delivery of PDCP PDUs, in-sequence delivery, and duplicate discarding may no longer be available to PDCP.

The PDCP may be configured to activate in-sequence delivery when at least some of the data is carried over a WiFi interface. For example, the WTRU may implement some form of reception window for the purpose of in-sequence delivery to upper layers.

With this PDCP entity, the WTRU may be configured with an Acknowledged Mode. For example, the PDCP may implement some form of reception window for the purpose of reliability, possibly the same window as used for in-sequence delivery.

Furthermore, the handling of PDCP Sequence Numbers (SNs) may be impacted from the absence the LTE RLC when PDCP is carried over the WiFi interface. Gaps in the PDCP SN may be used to determine further indications.

Finally, aspects such as buffered data and other reporting (e.g., PDCP SRs) may be impacted in the LTE domain, at least for the PDCP of a bearer that is split across both radio interfaces. Additional triggers for PDCP SRs may be useful for PDCP buffer maintenance and/or reliability aspects, such as triggering PDCP-level retransmissions.

The following embodiments may address traffic recognition on the WiFi interface. In an embodiment, LTE data sent over WiFi may be carried using a special MAC address. The WTRU may be configured with a special MAC address for the connectivity associated to the WiFi interface. The MAC address may be used to indicate that LTE traffic is carried inside the MAC frame. In an embodiment, a single MAC address may be used to carry any type of traffic associated to any LTE bearer (e.g., for the transport of any PDCP PDU).

For example, in the downlink (DL), the co-located or non-co-located WLAN AP may use this special MAC address as the destination address in the DL 802.11 MAC frames for the data split from the base station. In the uplink (UL), the WTRU may use this special MAC address as the source address in the UL 802.11 MAC frames.

In the DL, the base station may link the data to the special WTRU MAC address when it requests the co-located AP to deliver the data through a WLAN interface to the WTRU. The WTRU may decide that it is the destination of the data by matching its configured special MAC address with the destination address of the DL MAC frames. The linkage may be a configuration aspect established as part of a configuration procedure between the base station and the WLAN AP.

The association between data traffic associated with LTE bearers may be based on a WTRU-specific logical connection between the base station and the WLAN AP (e.g., a tunnel). The WLAN AP may match the traffic received from the base station using the connection to its transmissions for the concerned WTRU using the configured MAC address. Conversely, in the UL, data received by the WLAN AP using the MAC address may be forwarded over the logical connection back to the base station.

Alternatively, the association may be based on the reception, over the interface between the base station and the WLAN AP, of the combination of the LTE data and the identifier (e.g., the MAC address or equivalent) associated to the concerned WTRU for downlink and/or uplink traffic. The linkage may also be a configuration aspect that is part of the configuration procedure between the base station and the WTRU for the association of the data traffic associated to LTE bearers that is offloaded over the WiFi interface.

Figure 8:
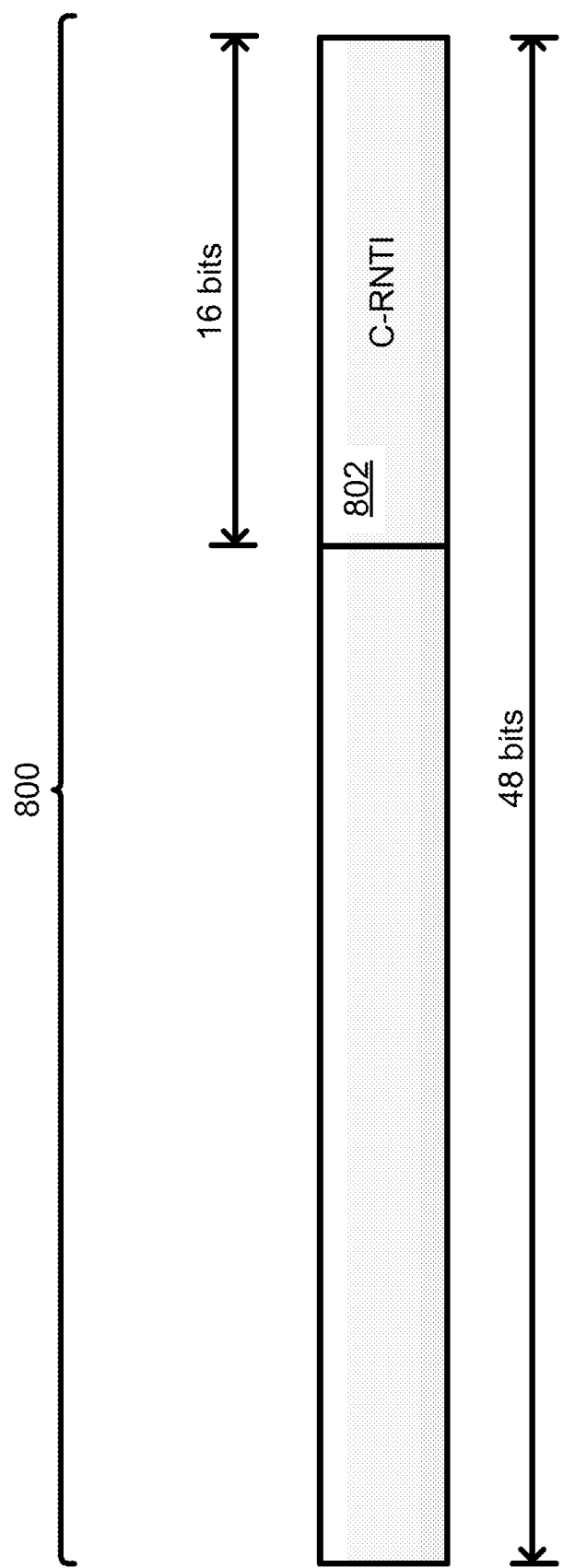
FIG. 8 is a diagram of a special WTRU media access control (MAC) address with a Cell Radio Network Temporary Identifier (C-RNTI) as the last 16 bits.

Referring now to FIG. 8, a diagram of a special WTRU MAC address 800 with Cell Radio Network Temporary Identifier (C-RNTI) 802 as the last 16 bits is shown. The special WTRU MAC address 800 may be created by replacing the first or last 16 bits of an original MAC address with the WTRU's C-RNTI 802. In the downlink, the WTRU may decide that it is the destination of the frames based on 16 bit C-RNTI 802 value in the destination address. In the uplink, the AP may retrieve the 16-bit C-RNTI 802 from the source address and send the C-RNTI value to the base station, together with the data, so the base station can relate the data to the corresponding WTRU.

Figure 9:
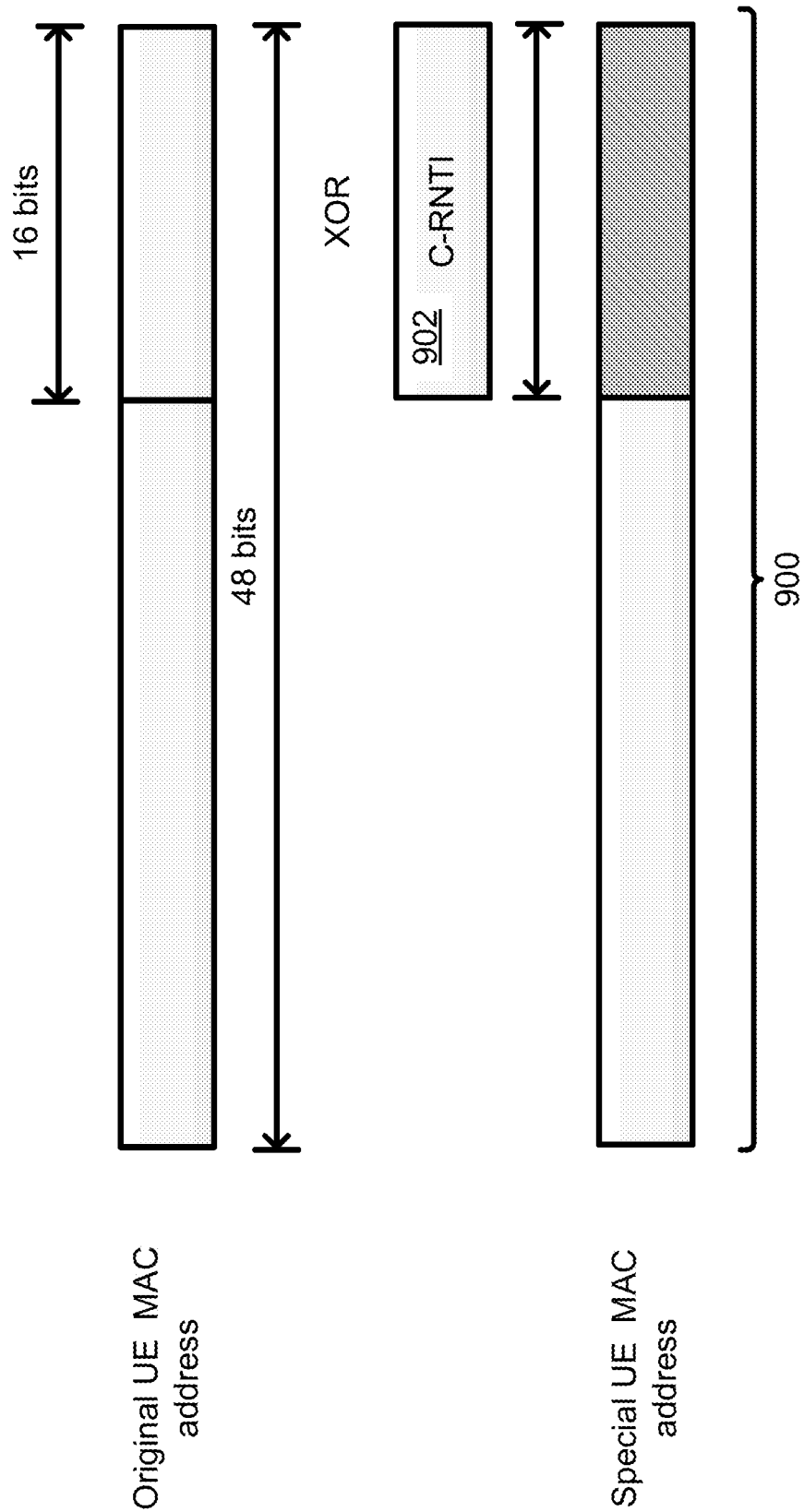
FIG. 9 is a diagram of a special WTRU MAC address created by a except-or (XOR) operation with a 16-bit C-RNTI.

Referring now to FIG. 9, a diagram of a special WTRU MAC address 900 created by an except-or (XOR) operation with a 16-bit C-RNTI 902 is shown. To conceal the plain C-RNTI value in the MAC address for security concerns, the special WTRU MAC address 900 can also be created by a XOR operation between the 16-bit C-RNTI value and the last 16 bits of the WTRU MAC address. In the downlink, the WTRU may take another XOR operation between its 16-bit C-RNTI and the last 16 bits of the destination MAC address. If the result matches the original MAC address then the frame may be destined for this WTRU.

Further multiplexing may be achieved using a MAC address generated with a LTE local channel connection identifier (LCID).

Figure 10:
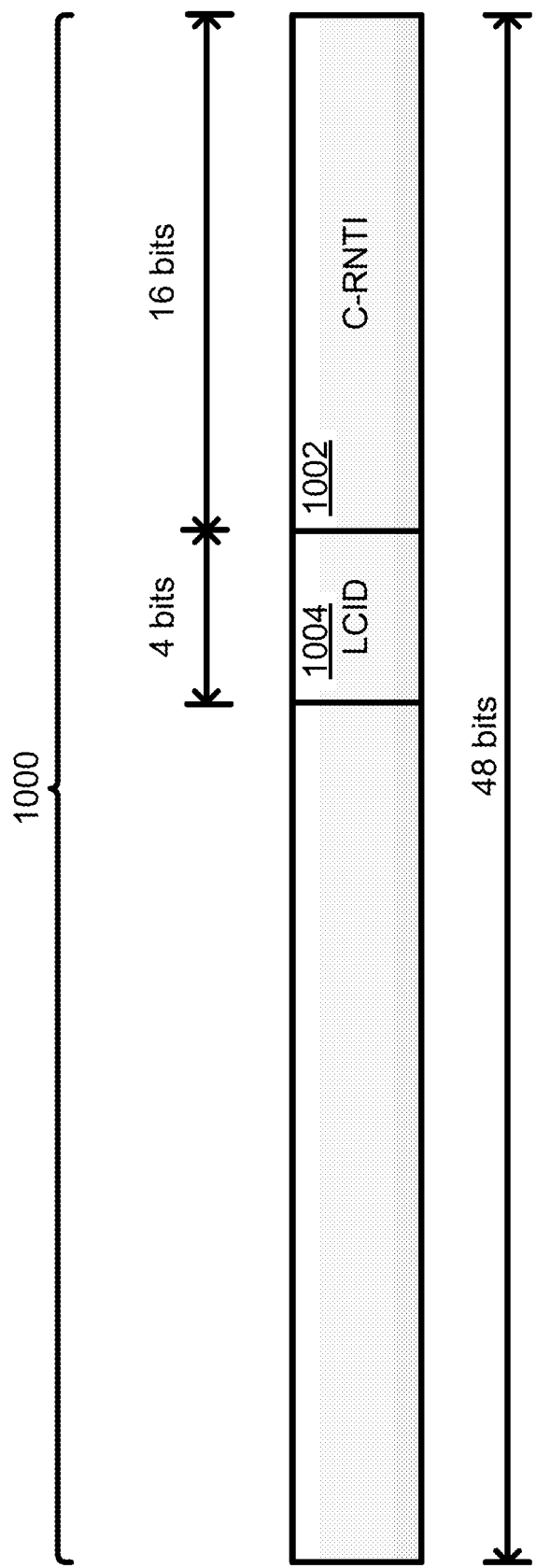
FIG. 10 is a diagram of a special WTRU MAC address with a local channel connection identifier (LCID)

Referring now to FIG. 10, a diagram of a special WTRU MAC address 1000 with LCID 1004 is shown. In the DL or UL 802.11 MAC frames, the special MAC address 1000 may also include one additional value. The value may be a LCID value 1004 associated with the transmitted data. In the downlink, by reading the LCID value 1004 in the destination address, the WTRU may be able to submit the received packets to the corresponding PDCP or RLC entities. In the uplink, the AP may retrieve the LCID value 1004 and send it to the base station together with the C-RNTI 1002 and data, so the base station may relate the data to the corresponding WTRU and logical channel.

The base station may configure this special WTRU MAC address via RRC messages such as RRCConnectionReconfiguration. Alternatively, a WTRU doesn't need an explicitly configured special MAC address if it is specified that the last 16 bits of a special MAC address should be the WTRU's C-RNTI.

Figure 11:
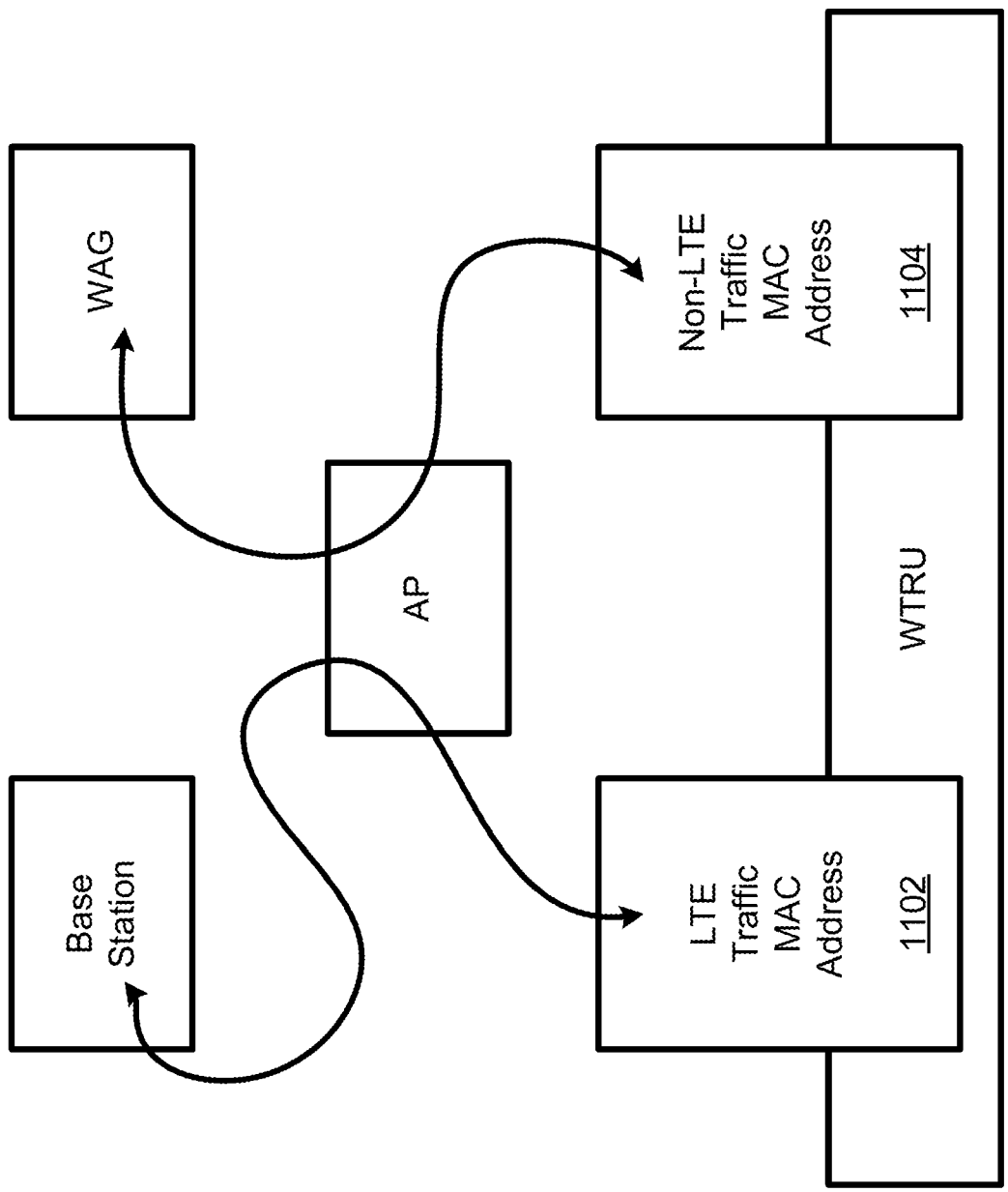
FIG. 11 is an illustration of traffic recognition based on a WTRU-specific MAC address for Long Term Evolution (LTE) traffic and a WTRU-specific MAC address for non-LTE traffic.

Referring now to FIG. 11, an illustration of traffic recognition based on a WTRU-specific MAC address for LTE traffic 1102 and a WTRU-specific MAC address for non-LTE traffic 1104 is shown.

Further multiplexing may be achieved using specific field in the MAC frame. In an embodiment, the WTRU may be configured with a MAC address for data offload over the WTRU's WiFi interface (e.g., a MAC address associated with the interface between the base station and the AP). The WTRU may determine that the data received over the WiFi interface corresponds to LTE data if the MAC address field Source Address (SA) value matches a specific value, which may be configured by L3/RRC signaling.

For example, the WTRU may be configured with a SA address for reception of downlink traffic that indicates that the data corresponds to LTE data. In this case, the TA address (Transmitter Address) may be set to the address of the WLAN AP (e.g., the WLAN AP's MAC address for the WiFi interface). In this case, the Destination Address (DA) and the Receiver Address (RA) may be set to the WTRU's address (e.g., the WTRU's MAC address for the WiFi interface).

In an embodiment, for reception of downlink traffic, the SA address may be configured such that the WTRU may determine the identity of the bearer. In other words, the SA address may be bearer-specific. In an embodiment, the SA address may be specific to a group of bearers, per type of bearer (e.g., split or non-split/only over WiFi), per configuration of a group of bearers, or the like. In an embodiment, the WTRU's MAC address may be configured such that it indicates if the data is for LTE bearers.

In an embodiment, a WTRU that is configured for WiFi offload may determine that the received transmission is for non-LTE traffic (e.g., it contains IP packets) if the SA is set to a value corresponding to an interface between the WLAN AP and the WLAN Access Gateway (WAG), or any value that is different from the value or set of values that the WTRU is configured with for LTE traffic offload in the downlink.

The WTRU may be configured with a DA for transmission of uplink traffic that indicates that the data corresponds to LTE data (e.g., a MAC address associated with the interface between the base station and the AP). In this case, the RA may be set to the address of the WLAN AP (e.g., the WLAN AP's MAC address for the WiFi interface). In this case, the SA and the TA may be set to the WTRU's address (e.g., the WTRU's MAC address for the WiFi interface).

In an embodiment, for transmission of uplink traffic, the DA may be configured such that the WTRU may determine the identity of the bearer. In other words, the DA may be bearer-specific. In an embodiment, the DA may be specific to a group of bearers, per type of bearer (e.g., split or non-split/only over WiFi), per configuration of a group of bearers, or the like. In an embodiment, the WTRU's MAC address may be configured, such that it indicates if the data is for LTE bearers.

In an embodiment, a WTRU configured for WiFi offload may set the value of the DA to a value corresponding to an interface between the WLAN AP and the WLAN Access Gateway (WAG), or any value that is different from the value or set of values the WTRU is configured with for LTE traffic offload in uplink transmissions when it performs an uplink transmission for non-LTE traffic.

Figure 12:
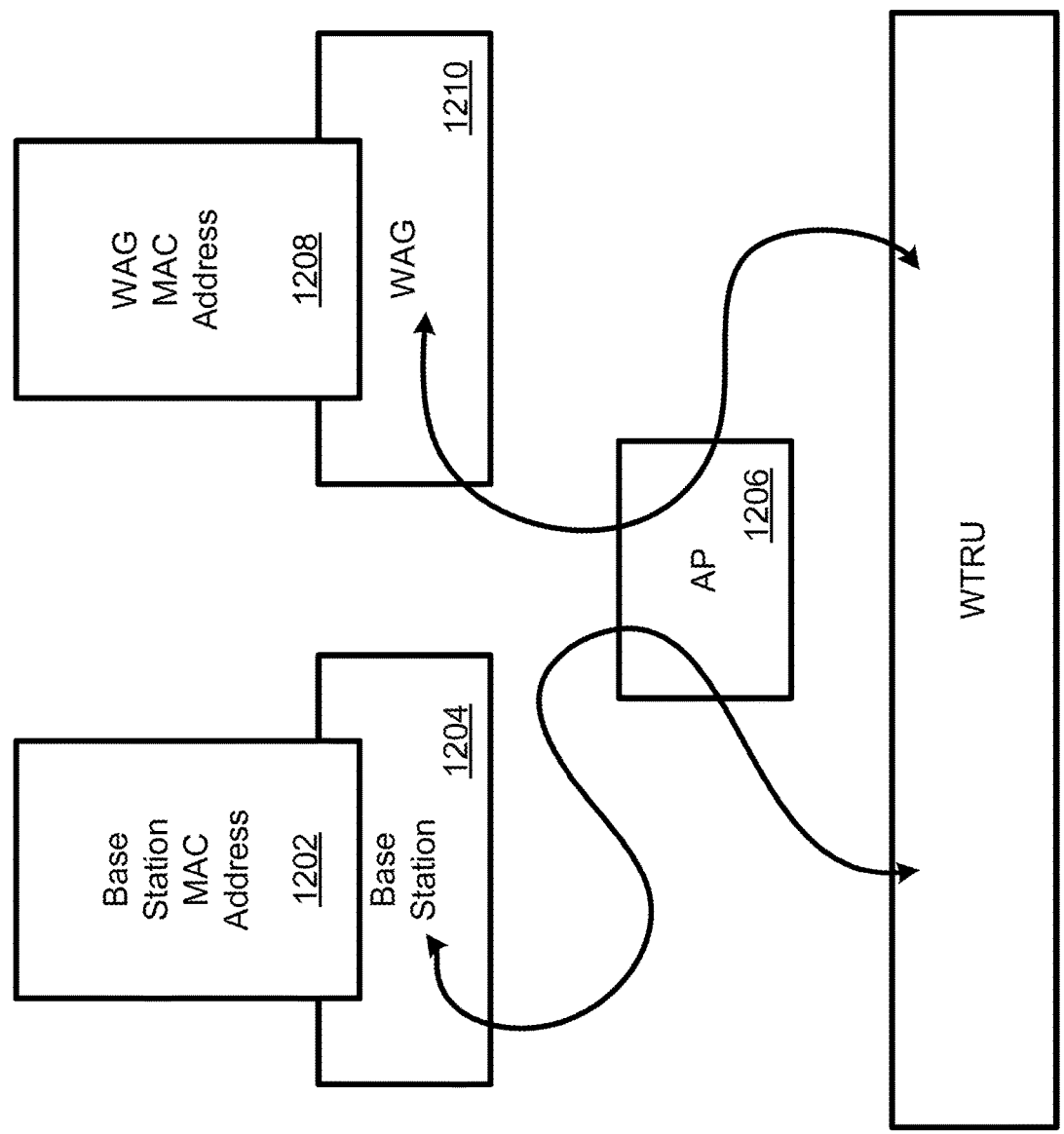
FIG. 12 is an illustration of traffic recognition based on differentiation between a MAC address for the interface between the base station and the AP and a MAC address for the interface between a wireless access gateway (WAG) and the AP.

Referring to FIG. 12, an illustration of traffic recognition based on differentiation between the MAC address 1202 for the interface between the base station 1204 and the AP 1206 and the MAC address 1208 for the interface between the WAG 1210 and the AP 1206 is shown.

In an embodiment, multiplexing may be performed using a basic service set identification (BSSID). In an embodiment, the co-located AP may be configured with a special MAC address (i.e., BSSID). In the downlink, the AP may use this special MAC address as the source address in the DL 802.11 MAC frames. In the uplink, the WTRU may use this special MAC address as the destination address in the UL 802.11 MAC frames. The AP may be configured with a single special MAC address for LTE/WLAN aggregation traffic, or it can be configured with a special MAC address for each WTRU that needs to receive/send LTE/WLAN aggregation traffic. The WTRU-specific special MAC address can be configured by replacing the first or last 16 bits of original MAC address with the WTRU's C-RNTI. Similarly, a XOR operation may be used to conceal the C-RNTI value. The AP may also include one LCID value as part of special MAC address in the 802.11 frames.

In an embodiment, the multiplexing information may be a L3/RRC configuration aspect. The AP's special MAC address may be broadcasted via system information, or it may be sent to the WTRUs that are subject to LTE/WLAN aggregation via dedicated RRC signaling. The WTRU-specific special AP MAC address may be sent to the WTRUs via dedicated RRC signaling.

Alternatively a WTRU may not need to be explicitly informed about a special AP MAC address if it is specified that the last 16 bits of a special AP MAC address should be the WTRU's C-RNTI.

The following embodiments may address upper layer signaling in support of user plane aggregation. In an embodiment, an aggregation event notification may be sent to the CN nodes. In an embodiment, the WTRU may report to the MME, via NAS message, when the LTE/WLAN aggregation for one or more bearers or for one or more application flows, has been activated or deactivated.

The WTRU may perform the reporting using NAS signaling, such as the BearerResourceModificationRequest message. The WTRU may use the Protocol Configuration Options (PCO) in the message to indicate the activation or deactivation event, and optionally the application flows associated with the indicated events. The WTRU may indicate both activation and deactivation events, each for a different set of application flows, in the same message. If no application flows are associated with the events, this may indicate that the whole bearer, which is identified by the "EPS bearer ID" in the message, is associated with the reported event.

Alternatively, the WTRU may use a modified Traffic Flow Template (TFT) in the BearerResourceModificationRequest message to indicate the change of radio access technology (RAT) of the application flows. The TFT or Packet Filter format may be extended to include the RAT type of each application flow.

After receiving the BearerResourceModificationRequest, the MME may forward it to the PGW through the SGW. Thus, the PGW may be notified of the aggregation events and may take actions accordingly. For example, the PGW may apply a different rate for those bearers or application flows if they, are offloaded to WLAN. The PGW may also trigger an event report to PCRF if necessary. In other words, the charging enforcement may be at the Traffic Detection Function (TDF) entity instead of the PGW.

Figure 13:
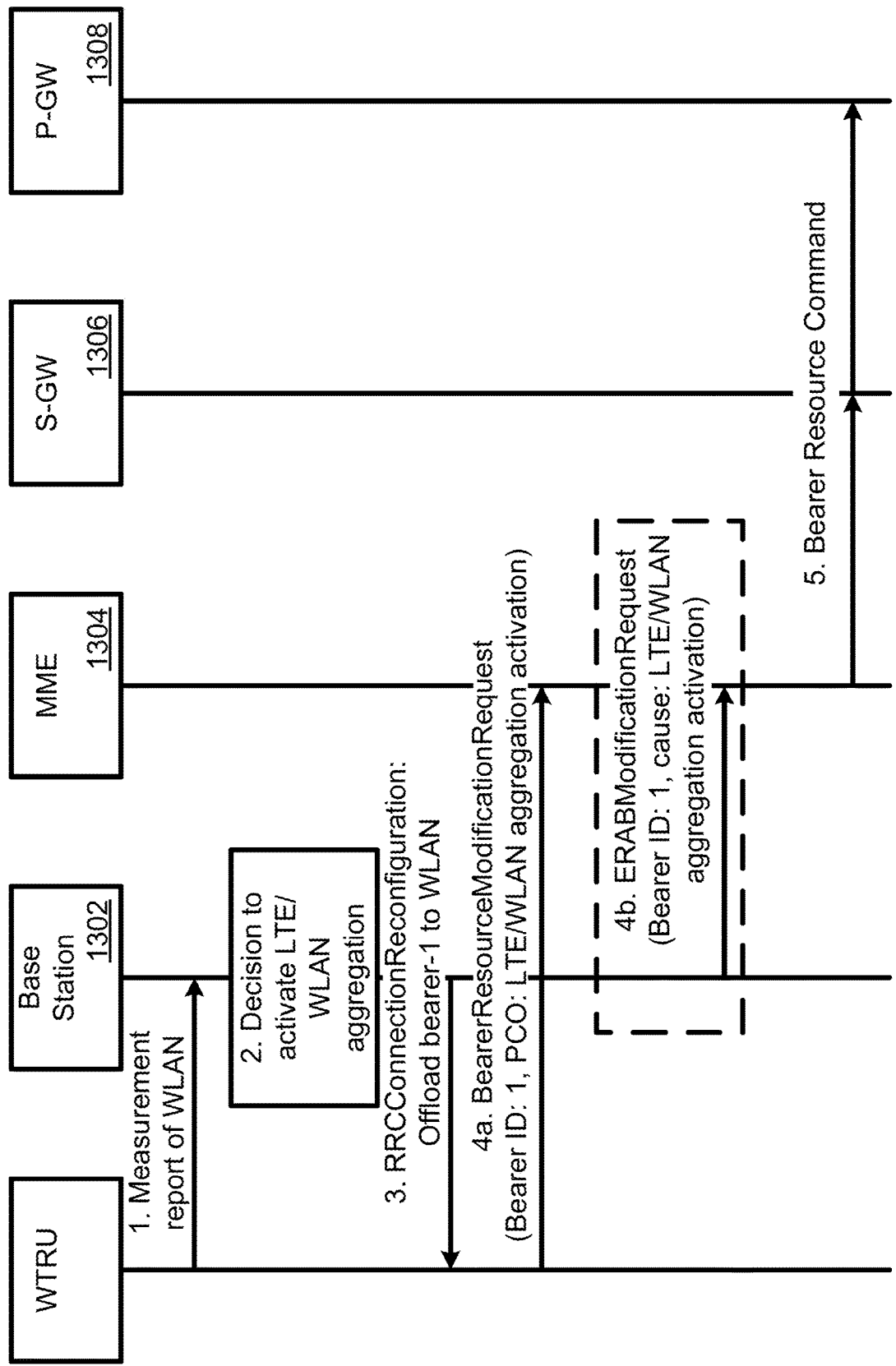
FIG. 13 is a flow diagram illustrating a scenario in which the base station reports to the MME, via a S1AP procedure, when it activates or deactivates the LTE/WLAN aggregation for one or more bearers or one or more application flows.

Referring now to FIG. 13, a flow diagram illustrating a scenario in which the base station 1302 reports to the MME 1304, via a S1AP procedure, when it activates or deactivates the LTE/WLAN aggregation for one or more bearers or one or more application flows is shown. A new base station 1302 initiated E-UTRAN Radio Access Bearer (E-RAB) modification procedure may be created for this purpose. In the base station E-RAB modification request to the MME 1304, the base station 1302 may indicate the bearer IDs or the application flows that are affected, and the RAT type that the bearers or the applications are now associated with. The base station may also indicate the cause of E-RAB modification request, which may be LTE/WLAN aggregation activation or deactivation. The MME 1304 may forward the information to the PGW 1308 through the SGW 1304. Thus, the PGW 1308 may be notified of the aggregation events and may take actions accordingly.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising:
first transceiver;
a second transceiver; and
at least one processor operatively coupled to the first transceiver and the second transceiver; wherein:
the at least one processor and the first transceiver are configured to receive information using a first radio access technology (RAT);
the at least one processor is further configured to process bearers at a packet data convergence protocol (PDCP) layer, wherein the bearers include a first bearer for transmission using the first RAT, a second bearer for transmission using a second RAT, and a split bearer for split transmission using the first RAT and using the second RAT, wherein the PDCP layer supports in-sequence delivery of protocol data units (PDUs) to upper layers, wherein the first RAT is a cellular technology and the second RAT is a WiFi technology;
the at least one processor is further configured to provide PDCP processed bearer data to a corresponding one of the first transceiver or the second transceiver;
the first transceiver is further configured to transmit the PDCP processed bearer data for the first bearer and a first portion of the PDCP processed bearer data for the split bearer using the first RAT;
the second transceiver is configured to transmit the PDCP processed bearer data for the second bearer and a second portion of the PDCP processed bearer data for the split bearer using the second RAT;

the at least one processor is further configured to steer the PDCP processed bearer data corresponding to the first transceiver to the second transceiver for transmission using the second RAT based on measurements related to the second RAT; and the at least one processor is further configured to send a first status report associated with the first RAT and a second status report associated with the second RAT, wherein the first status report is a PDCP status report, and wherein the second status report includes missing PDCP PDUs associated with the second RAT, and wherein the second status report triggers a network to retransmit the missing PDCP PDUs associated with the second RAT using the first RAT.

2. The WTRU of claim 1, wherein the first RAT is long term evolution (LTE) technology.

3. The WTRU of claim 1, wherein the at least one processor and the first transceiver are further configured to evaluate conditions on the first RAT.

4. The WTRU of claim 1, wherein the at least one processor is further configured to steer the PDCP processed bearer data corresponding to the first transceiver to the second transceiver for transmission using the second RAT based on a comparison of the measurements related to the second RAT with a threshold value.

5. The WTRU of claim 4, wherein the threshold value is provided by a network.

6. The WTRU of claim 4, wherein the first transceiver is further configured to receive the threshold value using the first RAT.

7. The WTRU of claim 1, wherein the at least one processor and the second transceiver are further configured to take measurements related to the second RAT.

8. A method for use by a wireless transmit/receive unit (WTRU), the method comprising:

receiving information using a first radio access technology (RAT);

processing bearers at a packet data convergence protocol (PDCP) layer, wherein the bearers include a first bearer for transmission using the first RAT, a second bearer for transmission using a second RAT, and a split bearer for split transmission using the first RAT and using the second RAT, wherein the PDCP layer supports in-sequence delivery of protocol data units (PDUs) to upper layers, wherein the first RAT is a cellular technology and the second RAT is a WiFi technology;

providing PDCP processed bearer data to a corresponding one of the first transceiver or the second transceiver;

transmitting the PDCP processed bearer data for the first bearer and a first portion of the PDCP processed bearer data for the split bearer using the first RAT;

transmitting the PDCP processed bearer data for the second bearer and a second portion of the PDCP processed bearer data for the split bearer using the second RAT;

transmitting at least a portion of the PDCP processed bearer data for the first bearer using the second RAT based on measurements related to the second RAT; and sending a first status report associated with the first RAT and a second status report associated with the second RAT, wherein the first status report is a PDCP status report, and wherein the second status report includes missing PDCP PDUs associated with the second RAT, and wherein the second status report triggers a network to retransmit the missing PDCP PDUs associated with the second RAT using the first RAT.

9. The method of claim 8, wherein the first RAT is long term evolution (LTE) technology.

10. The method of claim 8, further comprising:
evaluating conditions on the first RAT.

11. The method of claim 8, further comprising:
transmitting at least a portion of the PDCP processed bearer data for the first bearer using the second RAT based on a comparison of the measurements related to the second RAT with a threshold value.

12. The method of claim 11, wherein the threshold value is provided by a network.

13. The method of claim 11, wherein the threshold value is received using the first RAT.

14. The method of claim 8, further comprising:
taking measurements related to the second RAT.

* * * * *